United States Patent [19]

Hunsinger et al.

[11] Patent Number: 5,745,525
[45] Date of Patent: Apr. 28, 1998

[54] METHOD AND SYSTEM FOR SIMULTANEOUSLY BROADCASTING AND RECEIVING DIGITAL AND ANALOG SIGNALS

[75] Inventors: Bill J. Hunsinger, Urbana; Derek D. Kumar, Champaign, both of Ill.

[73] Assignee: USA Digital Radio Partners, L.P., Linthicum, Md.

[21] Appl. No.: 485,599

[22] Filed: Jun. 7, 1995

Related U.S. Application Data

[63] Continuation of Ser. No. 274,140, Jul. 12, 1994.
[51] Int. Cl.⁶ .................................................. H04B 15/00
[52] U.S. Cl. ........................ 375/285; 375/200; 375/344; 375/346; 375/216
[58] Field of Search .................................. 375/200, 206, 375/208–210, 216, 285, 286, 316, 344, 347–349, 354, 355; 370/493–495, 464; 455/42, 52.3, 65, 205

[56] References Cited

U.S. PATENT DOCUMENTS

| | | | |
|---|---|---|---|
| 4,228,517 | 10/1980 | Constant | 364/724.19 |
| 4,238,849 | 12/1980 | Gassmann | 370/204 |
| 4,281,217 | 7/1981 | Dolby | 381/12 |
| 4,379,947 | 4/1983 | Warner | 370/204 |
| 4,403,331 | 9/1983 | Halpern et al. | 375/259 |
| 4,633,285 | 12/1986 | Hunsinger et al. | 257/222 |
| 4,658,296 | 4/1987 | Beech | 348/613 |
| 4,660,192 | 4/1987 | Pomatto, Sr. | 370/204 |
| 4,712,240 | 12/1987 | Schnerk | 381/3 |
| 5,038,402 | 8/1991 | Robbins | 455/6.3 |
| 5,073,898 | 12/1991 | Endo et al. | 375/200 |
| 5,103,459 | 4/1992 | Gilhousen et al. | 370/209 |
| 5,121,211 | 6/1992 | Koo | 348/614 |
| 5,121,407 | 6/1992 | Partyka et al. | 375/206 |
| 5,133,081 | 7/1992 | Mayo | 455/18 |
| 5,136,611 | 8/1992 | Kirimoto et al. | 375/200 |

(List continued on next page.)

FOREIGN PATENT DOCUMENTS

| | | |
|---|---|---|
| 0 279 349 | 8/1988 | European Pat. Off. . |
| 0 436 875 | 7/1991 | European Pat. Off. . |
| 695353 | 8/1953 | United Kingdom . |
| WO 79/00718 | 10/1979 | WIPO . |
| WO 83/02533 | 7/1983 | WIPO . |
| WO 88/03342 | 5/1988 | WIPO . |
| WO 92/19053 | 10/1992 | WIPO . |

OTHER PUBLICATIONS

Press et al., "Numerical Recipes," Cambridge Univ. Press, pp. 52–64 and 192–199 (1987).

Digital Communications, Third Edition, McGraw–Hill, Inc. John G. Proakis, Ph,D., P.E., Department of Electrical and Computer Engineering Northeastern Univ. (textbook reference).

*Primary Examiner*—Stephen Chin
*Assistant Examiner*—Amanda T. Le
*Attorney, Agent, or Firm*—Townsend and Townsend and Crew LLP

[57] ABSTRACT

A system and method for transmitting digital information through a medium such as atmospheric free-space includes a transmitter which generates a signal based on a basis set of mutually orthogonal, spectrally-shaped, sequences of substantially equal length and having predetermined autocorrelation values. The sequences may resemble noise in at least some of their characteristics. The orthogonality or cross-correlation characteristics, the autocorrelation characteristics and the resemblance to noise are due to features derived from sequences of pseudo-random numbers which themselves resemble noise in at least some of their characteristics. The waveform set based on the sequences is modulated digitally. The modulated set may be summed together along with a wideband reference signal of reduced amplitude and optionally an FM analog signal to form a composite signal which is broadcast typically through free space to at least one receiver. The receiver separates the analog FM signal from the digital signal and thereafter demodulates the digital data-carrying waveforms and outputs a stream of digital data. It has been determined to be resistant to multipath degradation.

3 Claims, 21 Drawing Sheets

U.S. PATENT DOCUMENTS

| | | | |
|---|---|---|---|
| 5,150,377 | 9/1992 | Vannucci | 375/206 |
| 5,164,959 | 11/1992 | Cai et al. | 375/200 |
| 5,175,710 | 12/1992 | Hutson | 367/135 |
| 5,202,900 | 4/1993 | Leitch | 375/278 |
| 5,210,770 | 5/1993 | Rice | 375/200 |
| 5,216,693 | 6/1993 | Nakamura | 375/209 |
| 5,218,717 | 6/1993 | Reitberger | 455/51.2 |
| 5,222,101 | 6/1993 | Ariyavisitakul et al. | 375/231 |
| 5,239,560 | 8/1993 | Daniel | 375/206 |
| 5,241,562 | 8/1993 | Partyka et al. | 375/260 |
| 5,249,200 | 9/1993 | Chen et al. | 375/285 |
| 5,278,826 | 1/1994 | Murphy et al. | 370/343 |
| 5,278,844 | 1/1994 | Murphy et al. | 371/37.1 |
| 5,280,537 | 1/1994 | Sugiyama et al. | 375/200 |
| 5,282,222 | 1/1994 | Fattouche et al. | 375/200 |
| 5,285,472 | 2/1994 | Leonard et al. | 375/208 |
| 5,287,388 | 2/1994 | Ogura et al. | 375/344 |
| 5,291,289 | 3/1994 | Hulyalkar et al. | 348/723 |
| 5,291,520 | 3/1994 | Cole | 375/254 |
| 5,297,033 | 3/1994 | Bito et al. | 364/413.2 |
| 5,307,378 | 4/1994 | Norimatsu | 375/261 |
| 5,309,474 | 5/1994 | Gilhousen et al. | 370/209 |
| 5,497,372 | 3/1996 | Nankoh et al. | 370/69.1 |
| 5,588,022 | 12/1996 | Dapper et al. | 375/216 |

MICROSECONDS (μsec)

METHOD AND SYSTEM FOR SIMULTANEOUSLY BROADCASTING AND RECEIVING DIGITAL AND ANALOG SIGNALS

CROSS-REFERENCE TO RELATED APPLICATION

This application is a continuation application of co-pending U.S. patent application Ser. No. 08/274,140 filed Jul. 12, 1994.

BACKGROUND OF THE INVENTION

This invention relates to a method and system for simultaneously broadcasting and receiving digital and analog (e.g., FM) signals in a multipath environment.

In recent years, the quality of commercial audio broadcast signals as delivered by radio transmitters through atmospheric free-space has been eclipsed by the quality of stored program material, such as digital compact disc and audio tape technology. The quality differential of such stored digital program material over conventional analog frequency modulated (FM) broadcasting is so significant that there has been a market shift in listener preference to the stored digital program material. Further adding to this market shift is the increased degradation of FM signal quality, particularly in highly urban areas, due to multipath and noise.

Signals with line-of-sight propagation are subject to interference and fading from reflected copies of the signal, both narrowband and wideband. Such interference resulting from the simultaneous reception via multiple propagation paths between the transmitter and receiver is commonly referred to as multipath (MP), the different propagation paths having varying times-of-arrival, amplitude, and phase.

One of the most difficult environments in which to achieve high quality digital radio communication is the mobile reception of atmospheric free space signals in urban areas.

The principal impairment in such environments arises from multipath. Tall buildings and the like act as strong MP reflectors, particularly in the very high frequency (VHF) region of from about 30–300 MHz.

The adverse effects of multipath (MP) on an isolated signal waveform may be grouped at least into the following three categories: fading, dispersion, and intersymbol interference. Fading involves rapid amplitude variation as propagation paths constructively and destructively interfere, but may be controlled under certain circumstances with automatic gain control (AGC) circuits.

Dispersion is caused by time-varying phase disruption within and between bauds (symbols), and may be controlled under certain circumstances with an automatic equalizer.

Intersymbol interference (ISI) is caused by the interaction of one symbol (or waveform) with other symbols in time. An automatic equalizer, which may be used to correct phase dispersion, may compensate for adverse effects of intersymbol interference when the symbol shape of the interfering waveform is approximately identical to that of the desired channel. However, it is difficult and expensive to correct intersymbol interference from undesired propagation paths which represent different symbols of bit patterns that substantially precede or succeed the desired symbol in time.

Therefore, a conventional correction technique is to increase the time duration of the symbol interval (or baud interval) to be much longer than the expected multipath delay. Typical expected multipath delays generally range from a maximum of about 5 to about 30 microseconds (μs) for a VHF channel. However, the increase in time of the baud or symbol interval leads to a decreased data rate.

In multichannel systems with increased baud intervals, the shapes and characteristics of the basis waveforms have significant influences on the BER. (Basis waveforms are the unmodulated sequences representing the data carrier of each channel.) Accordingly, there has been research into desirable characteristics of signal waveforms usable in such multichannel environments for producing superior performance. This research has often been conducted in combination with the use of conventional correlation receivers. In a conventional correlation receiver, a satisfactory received signal is one which satisfies the spectral confinement requirements of the particular application, and is characterized by predetermined cross-correlation and autocorrelation properties.

The cross-correlation property (or orthogonality) is measured between a single signal waveform in a set and all other members of the waveform set. Low cross-correlation is important in multichannel carrier systems in order to ensure that the individual carriers may be recovered and recognized independent of one another. The cross-correlation represents the degree to which a particular waveform is mathematically correlated with one or more other waveform in the set. The smaller the absolute value of the cross-correlation between any two waveforms, the more unique are the waveforms in the correlation sense. Therefore, an ideal signal set for a correlation receiver has a cross-correlation of close to about zero at the sampling point among all pairs of the set. (In other words, it is a set where the waveforms are mutually orthogonal.) Good cross-correlation properties are also required for satisfactory channel performance absent multipath because channels act as sources of interference to each other.

Good autocorrelation is of primary importance in multipath environments because reception requires distinguishing among similar signals with varying times of arrival. (Autocorrelation is a measure of how unique a signal is when compared to itself in a correlation receiver when shifted in time by a positive or negative amount of time shift. An ideal signal set with respect to autocorrelation is one where the autocorrelation for each signal is at a minimum (or has a low value) for substantially all positive and negative time shifts and is at a maximum for about zero offset or, in other words, for relatively no time shift at all.)

Signal waveforms constructed from amplitude samples of unconstrained (or unshaped) and non-orthogonal noise sequences have been proposed and utilized in prior art communication systems (e.g., spread spectrum applications). In a similar manner, prior art systems have utilized prime polynomials to generate pseudo-random binary sequences (also known as PN or direct sequence) which are limited to the values +1 and −1. Such bi-valued systems possess noise-like properties to a limited extent.

The prior art method of Code Division Multiple Access (CDMA) utilizes long baud intervals in a plurality of digital data channels, each carrier being a binary sequence obtained from, for example, Gold codes or Rademacher-Walsh codes. CDMA systems are spread spectrum systems that use multiple binary-valued codes to achieve a higher throughput or increased capacity than a single spread spectrum code. CDMA codes generally must make a tradeoff between cross-correlation and autocorrelation, but typically cannot satisfy acceptable characteristics with respect to both.

A primary disadvantage of CDMA. is that it does not permit spectral shaping of the carrier(s) without significant destruction of the sequence properties. Additionally, the number of different acceptable signals which may be generated by CDMA codes is limited by the bi-valued nature of such signals.

In applications where spectrum compliance is not an issue, direct-sequence spread spectrum techniques which utilize noise-like waveforms are effective in combating multipath. However, existing techniques for constructing noise (or the more restrictive example of pseudo-noise) waveforms do not permit arbitrary constraints in the shape of their spectral response without significantly disrupting the resulting waveform properties. This is important because practical systems require band limiting filters or similar processing in order to stay within a fixed frequency allocation and/or reject particular narrowband interference. Furthermore, although the cross-correlation is small in spread spectrum systems, it is generally non-zero and hence the signal waveforms act as interferers to one another even in the absence of multipath.

U.S. Pat. No. 5,278,826 discloses a method and apparatus for digital audio broadcasting and reception wherein a system is provided for transmitting and receiving through free space a composite signal consisting of a frequency modulated (FM) analog signal and a multicarrier modulated digital signal which is especially adapted to be resistant to multipath degradation. The FM signal and digital multicarrier modulated signal are fully coherent. The digital signal comprises a plurality of carriers having a maximum amplitude at least 20 dB below the unmodulated FM signal, preferably 30 dB below the FM signal. Unfortunately, the multicarriers making up the digital signal in this patent are narrowband in nature, each carrier or channel being a single tone which is phase modulated. A problem with such carriers is that multipath (MP) is a frequency selective phenomenon which alters or destroys some frequencies while letting others alone. Thus, narrowband carriers are extremely vulnerable to the adverse effects of multipath. Furthermore, the digital frequency spectrum in this patent is extremely close to the FM center frequency, thus resulting in interference between the FM and digital signals.

U.S. Pat. No. 4,403,331 discloses a method and apparatus for transmitting digital data over limited bandwidth channels, with a set of waveforms being mutually orthogonal to one another and bi-phase data modulation in order to use a correlation-type multiple channel or multicarrier receiver. This patent discloses a technique for determining eigenvectors for the basis functions which maximize the spectral occupancy of the carrier waveforms primarily by utilizing a longer baud interval. The basis functions are based on a fixed number of sinusoids (which are not noise-like), and the system utilizes optimization in the frequency domain. Unfortunately, this does not translate into good autocorrelation properties or result in waveforms which may be made phase-continuous at the baud boundaries. The lack of phase continuity at baud boundaries increases intersymbol interference, thereby limiting the ability to properly receive signals with good BER. Optimization in the frequency domain does not translate necessarily into optimization in the time domain.

SUMMARY OF THE INVENTION

According to the invention, a system and method for transmitting digital information through a medium such as atmospheric free-space includes a transmitter which generates a signal from a wideband spectrally-shaped set of mutually orthogonal basis signal waveforms of substantially equal duration and bandwidth and which have desired autocorrelation characteristics. The sequences may resemble noise in at least some of their characteristics. The orthogonality or cross-correlation characteristics, the autocorrelation characteristics and the resemblance to noise are due to features derived from sequences of pseudo-random numbers which resemble noise in at least some of their characteristics. The waveform set or corresponding digital sequence set is modulated digitally and is resistant to multipath degradation. Digitally modulated orthogonal waveforms making up the modulated set may be summed together along with a wideband reference signal of reduced amplitude and optionally with an FM analog signal to form a composite signal which is broadcast typically through free space to at least one receiver. The receiver separates the analog FM signal from the digital signal and thereafter demodulates the digital data-carrying waveforms and outputs a stream of digital data. An FM radio station may simultaneously broadcast the same program both digitally and via analog FM using the same composite signal and transmitting antenna.

A basis signal set is provided for use in developing the broadcast signal. The basis signal set comprises a plurality of different wideband waveforms which have at least some characteristics resembling noise, the set being constructed of numerical sequences having characteristics resembling noise but which are of a predetermined length, have predetermined autocorrelation characteristics and wherein the plurality of wideband sequences making up the signal set are substantially orthogonal in pairs as referenced to a sampling point in time.

A line-of-sight (FM broadcast band) wideband signal is robust to multipath degradation and intersymbol interference. The invention provides a high spectral efficiency digital communication link in channels with known colored interference and multipath.

This invention will now be described with respect to certain embodiments thereof, accompanied by certain illustrations.

DETAILED DESCRIPTION OF THE PREFERRED EMBODIMENTS

Figure 1:
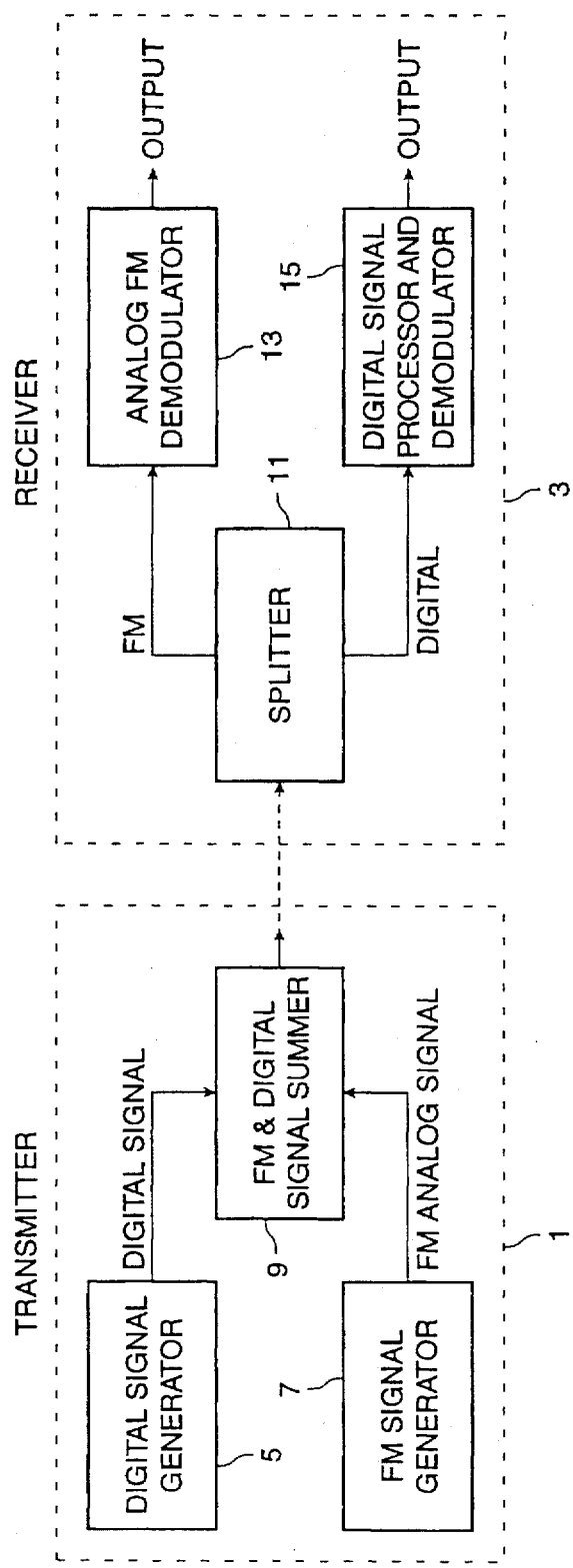
FIG. 1 is a block diagram of a broadcast system including a transmitter and receiver according to a first embodiment of this invention.

Referring now more particularly to the accompanying drawings in which like reference numerals indicate like parts.

In FIG. 1, a system for simultaneously broadcasting and receiving digital and analog signals invention includes transmitter 1 and receiver 3. Transmitter 1 simultaneously transmits or broadcasts both an analog frequency modulated (FM) signal and a digital signal, the two signals being summed together in summer 9 to form a composite FM/digital signal. Preferably, when used for broadcast to automobiles and the like, the digital signal and the analog FM signal correspond in their content when demodulated by receiver for listening by a user, although this need not be the case. Transmitter 1 includes digital signal generator 5 and analog FM signal generator 7.

The composite FM/digital signal broadcast by transmitter 1 may be received by either a conventional analog FM receiver, a digital receiver, or a combination FM/digital receiver 3 as illustrated in FIG. 1.

Upon receiving the composite FM/digital signal at the radio frequency (RF) carrier frequency via an omnidirectional antenna (not shown), the composite FM/digital signal is divided into two paths by way of splitter 11.

A conventional analog FM demodulator 13 interprets the analog FM signal and outputs it in a conventional manner. The digital signal from splitter 11 is directed toward digital signal processor and demodulator 15. Digital processor and demodulator 15 processes the digital portion so as to output a digital audio data stream for reproduction.

The composite signal may also be received by a conventional FM receiver having a conventional FM demodulator 13. Alternatively, the composite signal may be received by a purely digital receiver according to another embodiment of this invention including only a digital signal processor and demodulator 15.

Figure 2:
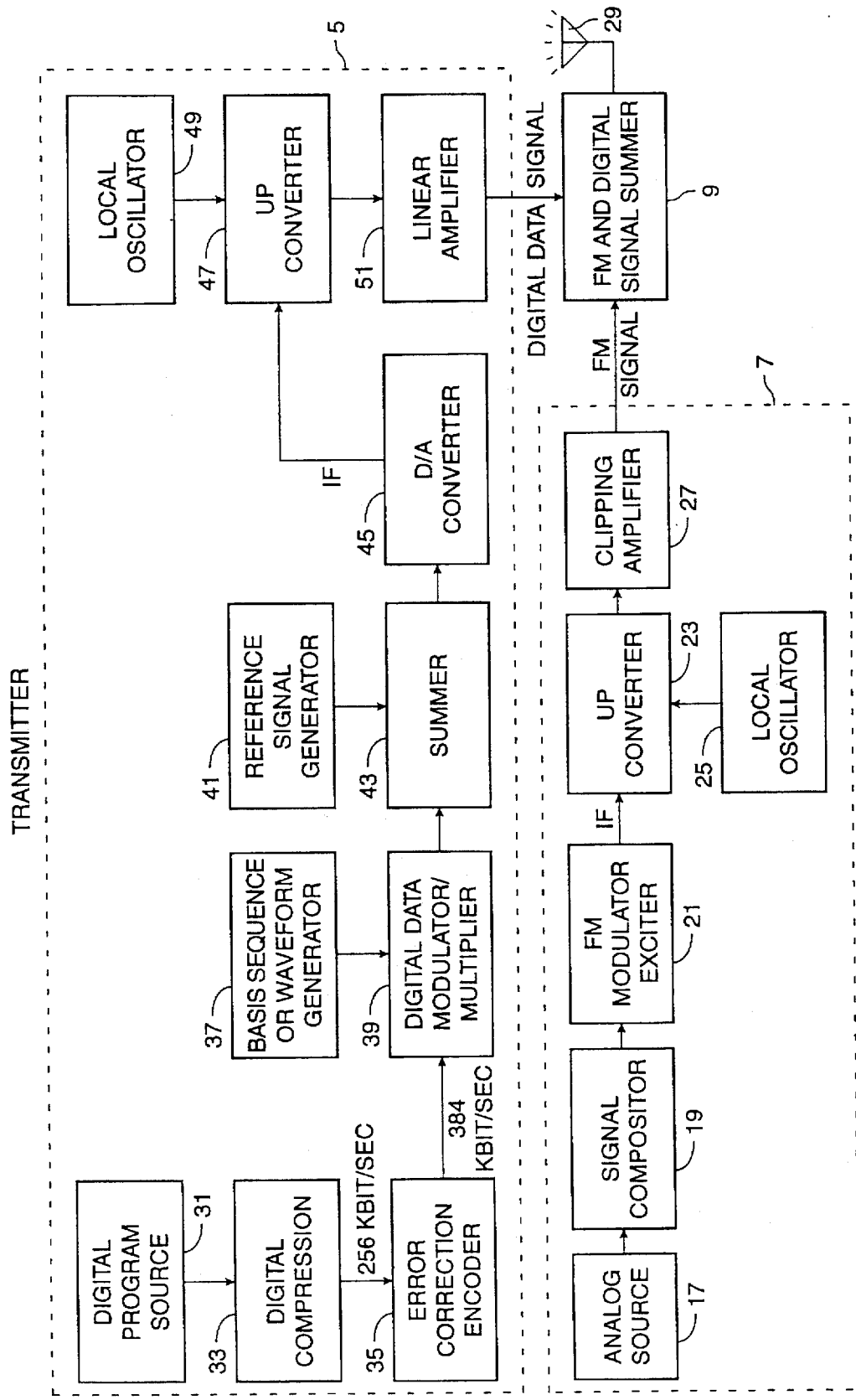
FIG. 2 is a block diagram of the transmitter portion of the first embodiment of this invention depicted in FIG. 1.

FIG. 2 is a more detailed block diagram of transmitter 1 shown in FIG. 1. Analog FM signal generator 7 generates an analog frequency modulated signal in a conventional manner utilizing analog source 17, signal compositor (or audio stereo generator) 19, FM modulator (or exciter) 21, upconverter 23, local oscillator (LO) 25, and clipping amplifier 27.

Analog source 17 may be any conventional program source but is typically an audio program source with the possible addition of a data or audio program source on a so-called SCA side carrier. Signal compositor 19 is representative of the stage of analog FM signal generation which produces the composite baseband signal, sometimes including a pilot tone. From source 17 and compositor 19, the signal is directed to frequency modulator or exciter 21 which is a subsystem for modulating the composite baseband signal of compositor 19 in a frequency typically across about a 200 kHz bandwidth or less in proportion to instantaneous amplitude of the composite signal to produce an output signal centered about a center frequency.

After signal processing via frequency modulator 21, the modulated signal is at an intermediate frequency (IF) and is then upconverted to the desired output frequency by upconverter 23 and local oscillator (LO) 25. The FM signal is thus centered about the center frequency of a particular broadcast channel. The upconverted signal may then be applied directly to summer 9 and transmitting antenna 29 for radiation, or alternatively may be processed through clipping amplifier 27.

Alternatively, upconverter 23 and LO 25 may be eliminated and in such a case exciter 21 would directly generate the final FM signal at the RF frequency.

FM modulator or exciter 21 may be a voltage-controlled oscillator (VCO) whose modulation is controlled by compositor 19. Furthermore, an SCA generator (not shown) may also feed exciter 21 in certain embodiments.

Digital signal generator 5 of transmitter 1 outputs a multicarrier or multichannel digital data signal to signal summer 9 using a digital program source 31, a digital compression subsystem 33, an error correction encoder 35, a basis sequence or waveform generator 37, a digital data modulator/multiplier 39, a reference signal generator 41, a modulated set and reference signal summer 43, a digital-toanalog (D/A) converter 45, an upconverter 47, a local oscillator 49, and a linear amplifier 51. Separate amplifiers are utilized for the digital and analog FM signals because the digital signal power level is smaller than the FM power level in certain embodiments, so a clipping amplifier can be used for the FM signal.

Alternatively, use of an IF may be avoided in the transmitter as shown in the transmitter embodiment of FIGS. 19B–19C hereinafter described. In this embodiment, the signal is directly modulated at the final RF carrier frequency by sending the samples from the MAC to an In-phase channel (I) D/A converter and a Quadrature-phase channel (Q) D/A converter in alternating fashion and using a hybrid I/Q modulator.

With reference again to FIG. 2, digital program source 31 may produce any conventional digitized program material, such as digitized audio data. Coupled to digital source 31 is digital compression subsystem 33 which reduces the bandwidth requirements of the audio signal. A suitable compression subsystem may, for example, operate in accordance with the MUSICAM standard described in U.S. Pat. No. 4,972,484. However, other compression is envisioned.

The compressed digital audio data making up a digital data stream of about 256 kbit/sec for example is then sent to error correction encoder 35 which adds redundancy of, for example, up to 128 kbit of error correction code in order to assist in signal recovery. Thus, the digital data stream emitted from error correction encoder 35 is the combination of the 256 kbit/sec data stream input into encoder 35 and the 128 kbit of error correction code to make up about a 384 kbit/sec data stream to be forwarded to modulator/multiplier 39. Encoder 35 may include a data scrambler which ensures that the resulting binary sequence is substantially random in pattern.

In certain embodiments of this invention, the audio signal is protected at error correction encoder 35 by a combination of different error correction codes. For example, the central audio portion or main portion (or other critical synchronization data) of the signal may be protected by a Viterbi code which works at high levels of interference and is fairly aggressive in nature, while the higher and lower portions of the signal are encoded with Reed-Solomon block coding. Thus, a combination of Viterbi and Reed-Solomon error correction codes may be used to protect the audio signal, with each code protecting a different portion of the signal. Apparatus for such a combination of Viterbi and Reed/Solomon encoding may be obtained from Corporate Computer Systems (CCS) based in Holmdel, N.J. Alternatively, conventional Reed-Solomon error correction code may be utilized to protect the entire audio signal.

When the combined audio and error correction code (ECC) data proceeding at a rate of 384 kbit/sec reaches modulator/multiplier 39, it is applied to a set of orthogonal basis sequences or waveforms from generator 37.

FIGS. 3–18 herein are used to describe the functionality and output of basis sequence generator 37. FIGS. 3–6 illustrate certain advantages of wideband signals, and FIGS. 7–18 illustrate the characteristics and processes utilized for generation of the set of basis sequences or waveforms. The generator 37 in this example produces a set of 48 unique sequences or "waveforms" for each baud, each corresponding to a different digital carrier or channel.

Figure 3A:
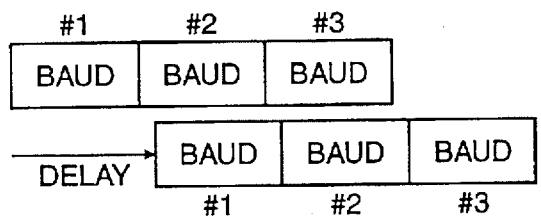
FIGS. 3A and 3B are a schematic illustration of certain advantages associated with long baud intervals in multipath environments.
Figure 3B:
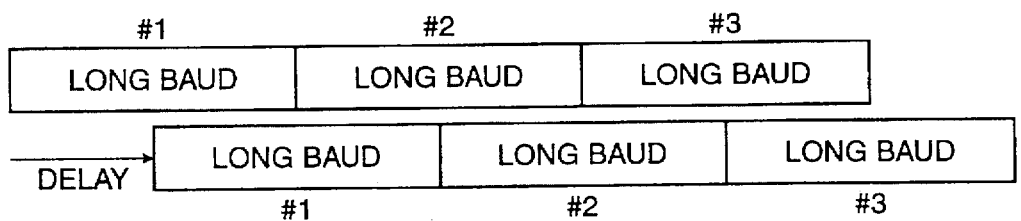

FIGS. 3A and 3B illustrate two approaches for digital data transmission, FIG. 3A illustrating a multipath delay greater than the baud interval or length being utilized, and FIG. 3B illustrating a lengthened baud interval resulting in the multipath delay being shorter than the baud interval. In FIG. 3A, the relatively short baud interval causes baud #1 as delayed to overlap baud #2 as directly transmitted, the delayed baud pattern being illustrated below the directly transmitted baud patter unaffected by multipath. Because the baud interval in FIG. 3A is shorter than the multipath delay, substantial intersymbol interference results.

However, as illustrated in FIG. 3B, because the baud interval is longer than experienced multipath delay, intersymbol interference is reduced because delayed baud #1 only overlaps directly transmitted baud #1 (not baud #2). Thus, low baud rates (equivalent to longer baud intervals) are more robust or resistant to multipath problems, the baud rate being defined as the reciprocal of the baud period or interval. There is a limit to the length of a baud—if the baud is too long, then the carrier frequency may not be sufficiently stable during the entire baud interval, particularly in mobile situations where the Doppler frequency varies as a vehicle containing the receiver changes velocity. The typical practical limit is less than about a millisecond.

Unfortunately, long baud intervals reduce intersymbol interference at the expense of data rate. The use of baud intervals longer than the expected multipath delay keeps the transmitted bauds synchronized and reduces error due to intersymbol interference but results in lower data rates than do the shorter baud times shown in FIG. 3A. Therefore, to achieve the same data rates in the systems of FIGS. 3A and 3B, the system utilizing longer baud times (e.g., FIG. 3B) must increase the number of transmission channels or carriers within a particular bandwidth (i.e., more channels or carrier per baud are required).

Figure 4A:
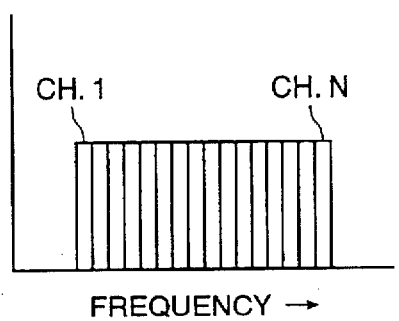
FIGS. 4A and 4B are graphs illustrating narrowband and wideband (broadband) signal sets, respectively, with respect to frequency allocation.
Figure 4B:
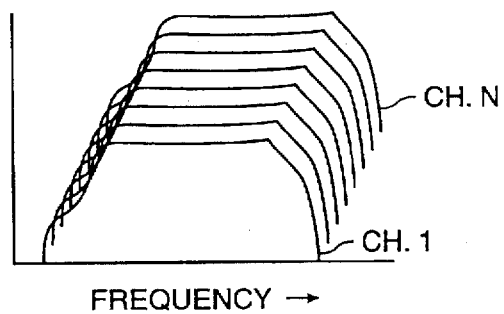

Wideband signals reduce the impact of multipath (MP) induced fading. FIGS. 4A and 4B illustrate and compare a narrowband (e.g., COFDM) set of N channels and a wideband set of N channels respectively.

In the narrowband case of FIG. 4A, each channel or carrier is assigned a particular and substantially different frequency, and each channel or carrier is functionally separated from the other channels at the receiver by a frequency filter. Thus, in the narrowband case illustrated in FIG. 4A, channel 1 is at the lowest frequency while channel N is at the highest frequency. In contrast to the narrowband approach, signals within a wideband set have the same general frequency characteristics and cover substantially the entire available frequency band. Thus, in the wideband case shown (in three dimensions) in FIG. 4B, channel 1 and channel N both cover substantially the entire band.

Figure 5A:
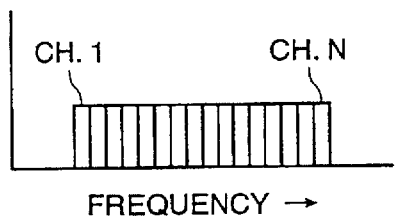
FIGS. 5A, 5B, 5C, and 5D are a plurality of graphs illustrating the impact of multipath nulls or interference upon both narrowband and wideband signal sets.
Figure 5B:
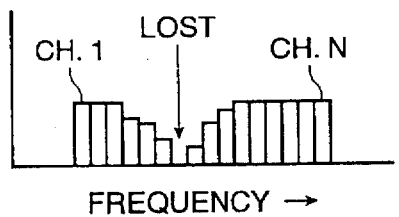

Wideband waveforms which define these signals have two significant requirements. The signals must be designed so that they are orthogonal in nature at the sample point, thus rendering them separable by a matched filter or MAC within the receiver, and the spectral shape of the transmitted signals must be such as to avoid conflict with colored interference. The advantage of wideband signals in combatting multipath nulls is illustrated in FIGS. 5A and 5B, which are graphs illustrating the response of channels or carriers without multipath nulls, while the graphs of FIGS. 5C and 5D illustrate channels experiencing multipath (MP) nulls.

Figure 5C:
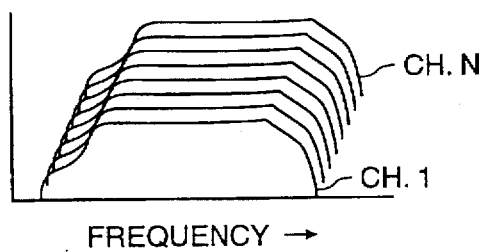
Figure 5D:
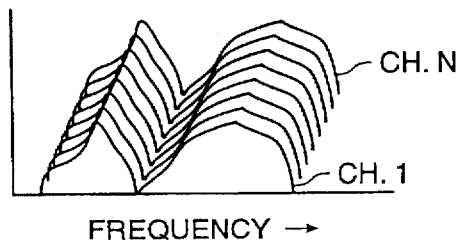

Multipath is considered a frequency specific interference, so the multipath null shown in the graphs of FIGS. 5C and 5D completely destroys one or more narrowband carriers or channels, and severely attenuates several others, but it does not completely destroy any wideband carriers. Therefore, in the face of a MP null, the error rate for a narrowband system cannot be better than 1/N, where N is the number of channels.

The multipath null in the wideband channels of FIG. 5D impacts all channels to a certain extent, but it leaves them all substantially intact. Each wideband channel thus has an opportunity to survive due to its remaining power.

Figure 6A:
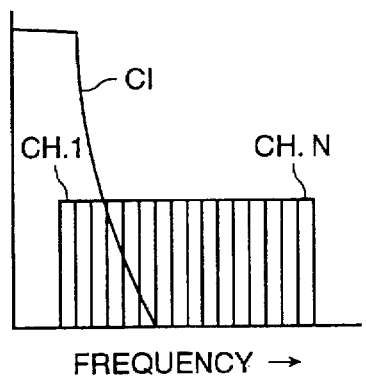
FIGS. 6A and 6B are graphs illustrating the adverse effects of colored interference upon narrowband and wideband carriers or signal sets, respectively.
Figure 6B:
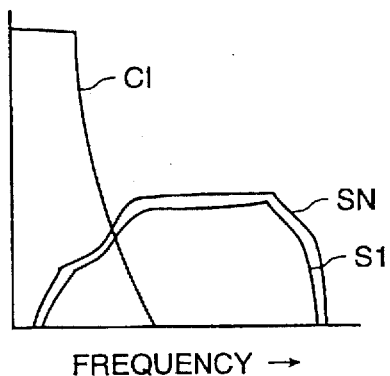

FIGS. 6A and 6B illustrate the impact of colored interference CI on multichannel or multicarrier receivers for receiving both the narrowband and wideband type signals. FIG. 6A illustrates narrowband signal impact, and FIG. 6B depicts wideband signal impact. Colored interference is interference with a strong power at one frequency region (covering one or more frequencies), and weak power at other frequency regions, that is interference having an unequal distribution of interfering energy as a function of frequency.

Because the wideband signals S1–SN illustrated in FIG. 6B all have substantially the same spectral shape and cover the entire frequency bandwidth, the impact of colored interference is minimized because each signal is left with an ample amount of power, even though all wideband signals suffer at least some impact due to the colored interference.

However, in the case of the frequency specific narrowband channels, the colored interference illustrated in FIG. 6A completely overwhelms narrowband channels 1–3, but it has no impact on channel N.

Baud lengths or intervals of about four times the longest expected multipath delay may be used in certain embodiments of this invention. Due to the numerous advantages discussed above with respect to wideband signal sets, basis sequence/waveform generator 37 generates a basis signal set made up of a plurality of wideband signals, each signal of the set having the same general frequency characteristics and covering substantially the entire available frequency band.

The basis set generated by generator 37 should be substantially orthogonal (or have a crosscorrelation of close to about zero at the sampling point of a waveform), so that each of the wideband waveforms can simultaneously coexist without interfering with one another.

Additionally, the basis set should have good autocorrelation properties for satisfactory performance in multipath environments, because reception in the face of multipath requires distinguishing among similar signals with varying times of arrival. An ideal signal set with respect to autocorrelation is one where each waveform or carrier within the set has an autocorrelation value of close to about zero for substantially all positive and negative time shifts, and an autocorrelation value which is at a maximum for no shift at all (or at zero time shift).

Such characteristics must be maintained in situations where the waveforms derived from the basis set are spectrally shaped with respect to frequency. Thus, the basis signal set output by generator 37 includes a plurality (e.g., 48 for each baud) of sequences which are mutually orthogonal, have good autocorrelation, and occupy a finite signal bandwidth (i.e., are spectrally shaped).

Figure 7:
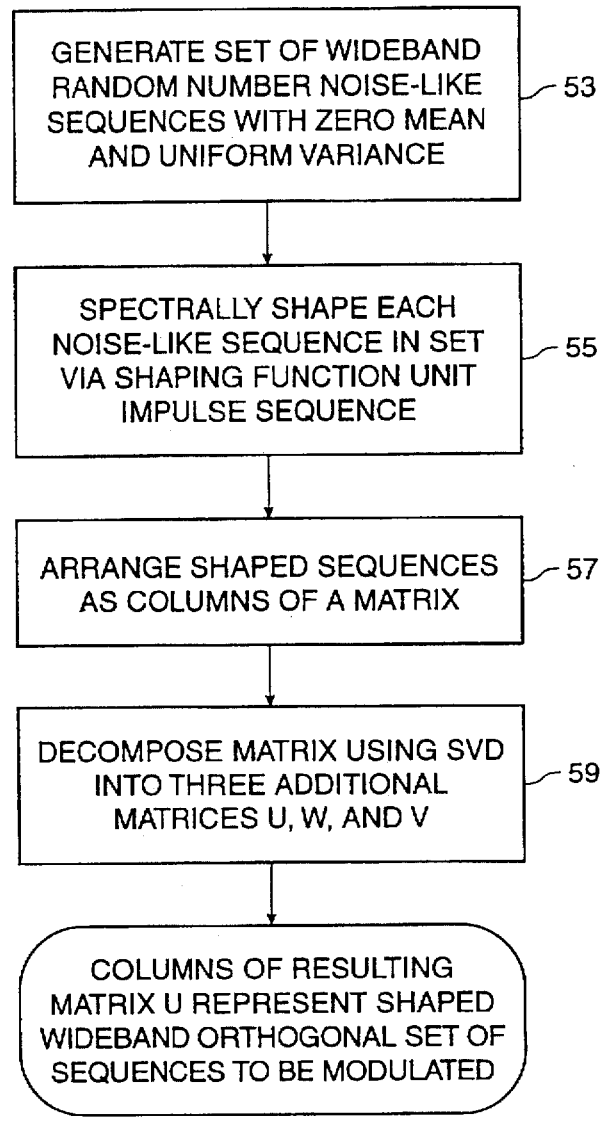
FIG. 7 is a flow chart illustrating steps utilized in generating a wideband orthogonal signal set having good autocorrelation characteristics according to the first embodiment of this invention.

FIG. 7 is a flow chart illustrating the steps taken by generator 37 in generating the basis sets.

Figure 8:
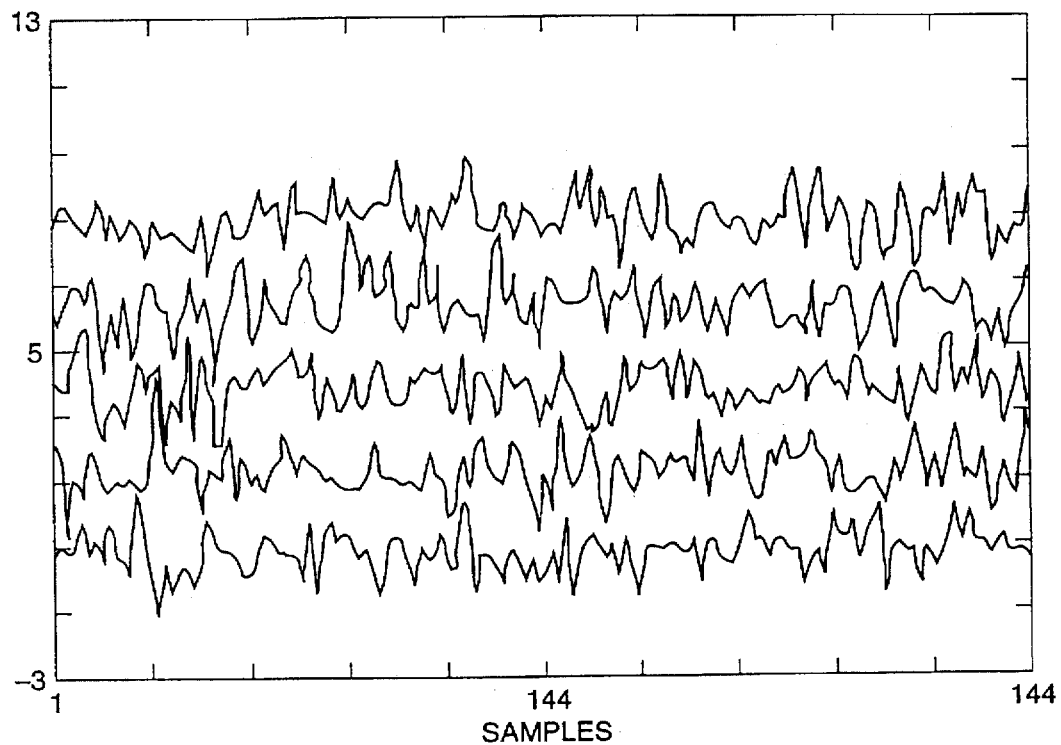
FIG. 8 is a graph illustrating five exemplary random number sequences resembling noise as generated in the first embodiment of this invention.

Generation begins with the numerical generation of a set of random number sequences with zero mean and uniform variance (Step 53). The choice of probability density function (PDF) for the random numbers is not critical. Uniform and normal PDFs have been found to have satisfactory performance for composite analog FM and digital audio data. The random numbers may be generated by a variety of conventional algorithms, e.g., shuffled linear congruential or subtractive algorithms as for example set forth in *Numerical Recipes: The Art of Scientific Computing.*, pp. 192–199. Step 53 produces uncorrelated numbers which are in nature across the entire set of sequences generated. Graphs of five exemplary such sample sequences depicted as waveforms are shown in FIG. 8. The maximum length of each sequence of random numbers is determined by the ratio of the baud interval to the sample interval. For example, the maximum length may be equivalent to 192 samples. However, as a result of further processing, it is often desirable that the sequence length of each waveform be further reduced by approximately the length of shaping functions hereinafter explained. In such a case, the random number sequences may have about 144 samples each. The number of sequences all of which resemble noise generated in step 53 must be at least as great as the number of data carrying elements required per baud in the overall transmission/reception system. In certain embodiments, twice as many sequences as the desired number of data carrying elements may be created. For example, where there is a data rate requirement of about 384 kbit/sec at a baud rate of about 8 kbit/sec, at least about 48 data carrying elements are required. Therefore, from about 48–100 random number sequences are generated in certain embodiments.

Unlike CDMA, with its two-valued coding scheme, according to the invention the sequences may take on significantly more distinguishable code values because multivalued random number generation with zero mean and uniform variance results in waveforms, which according to one aspect of the invention resemble noise and are therefore referred to as being noise-like, allowing greater degrees of freedom than do two-valued codes, and thus results in waveforms having good autocorrelation characteristics. The parameters "baud interval" and "sample interval" are parameters which are taken into consideration in designing the system according to the first embodiment of this invention. The sample interval (or equivalently the reciprocal of the sample rate) is the increment of the underlying grid of time intervals on which the digital amplitude samples are constructed and used in making up the basis waveforms. The maximum sample interval is set by the required Nyquist bandwidth of the shaping function. Thus, the maximum sample interval is about twice the shaping function bandwidth.

While there is no minimum sample interval, it is advantageous in certain environments to use as large an interval as possible, due to computational complexity increases associated with smaller intervals. For example, the sample rate for generating the basis waveforms may be about 1.536 million samples per second, (MSPS) with the sample interval being the reciprocal of this value (651 ns).

The "baud interval" is the interval of time which corresponds to the duration of a waveform or a symbol. Basis generator 37 outputs the same set of 48 carriers every increment of time defined by the baud interval. The product of the reciprocal of the baud interval and the number of data carrying elements herein loosely referred to as channels or carriers is the overall throughput (e.g., 384 kbit/sec) of the communication system. Increasing the baud interval improves the performance of the system by reducing the effect of intersymbol interference. Furthermore, the longer the baud interval, the more effective the method in determining sets of waveforms with the desired autocorrelation and crosscorrelation properties. The maximum baud interval is limited only by the receiver complexity, and in certain embodiments of this invention the baud interval may be about 125 μs. Thus, generator 37 in the first embodiment outputs the same basis set of 48 sample-space waveforms every 125 μs when such is the baud interval.

Figure 9:
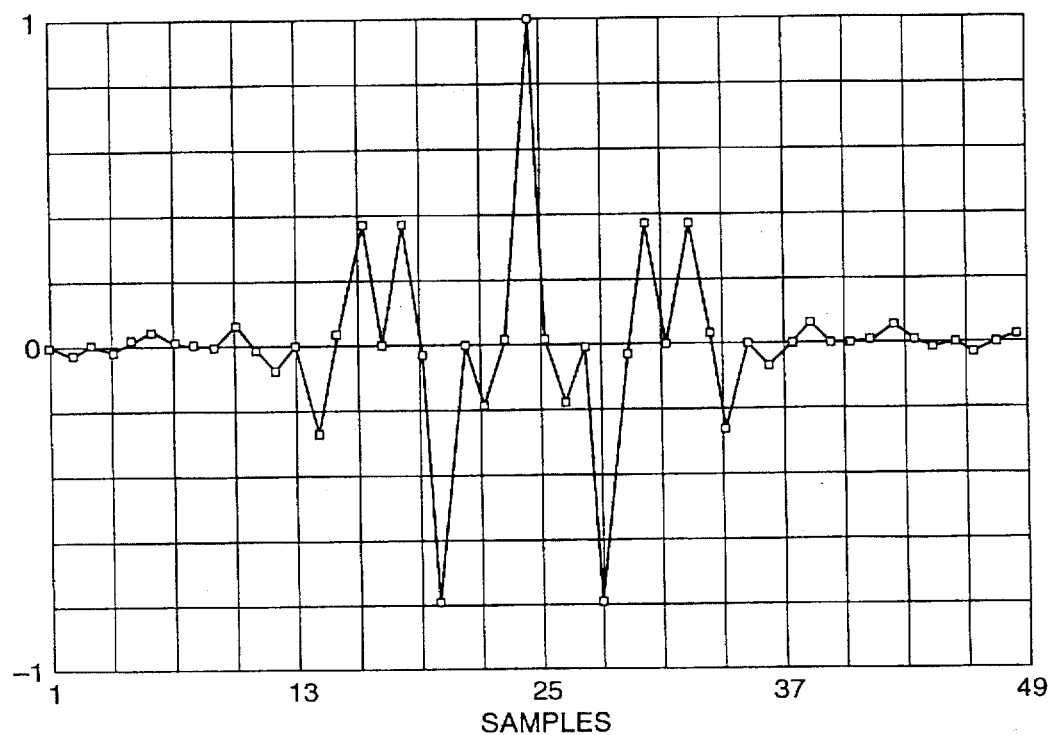
FIG. 9 is a graph illustrating the shaping function unit impulse response used to shape the random number sequences of FIG. 8 according to the first embodiment.
Figure 10:
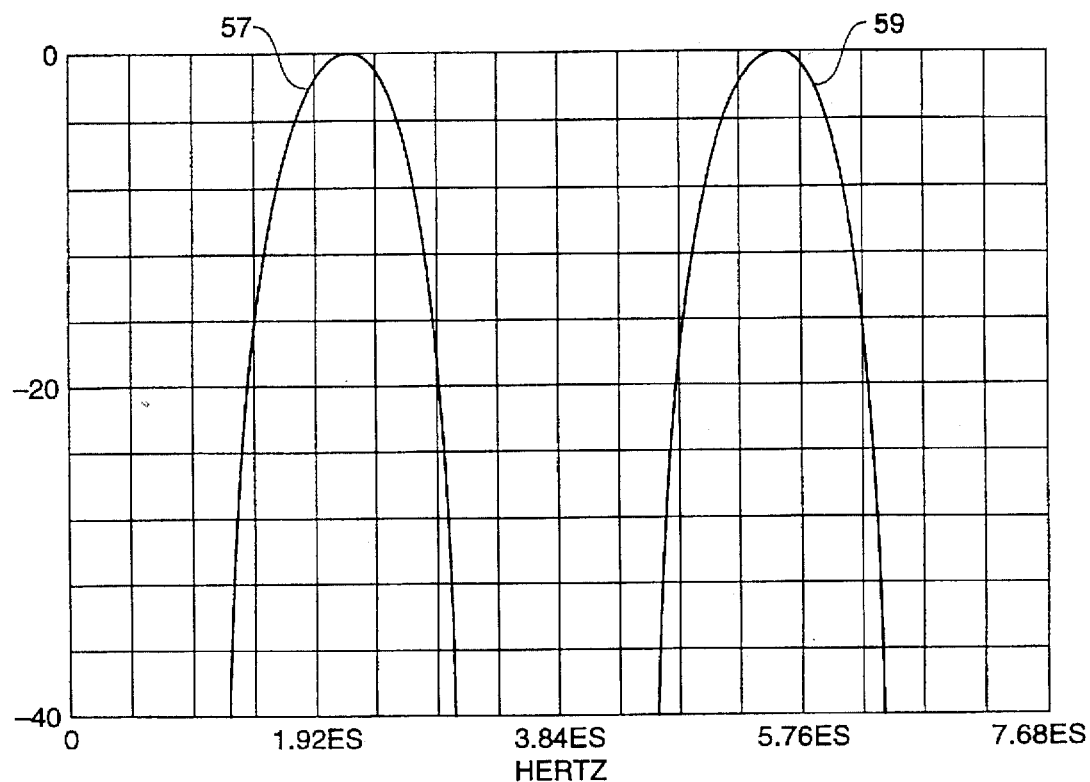
FIG. 10 is a graph illustrating the frequency response of the shaping function of FIG. 9 according to the first embodiment.

The sequences of FIG. 8 (representing five of at least 48) are generally unsuitable for direct use because they have poor crosscorrelation properties and are not subject to any spectral confinement. In fact, these random number waveforms generated in Step 53 are wideband all the way to the Nyquist frequency. Therefore, each of the (48) sequences is spectrally shaped by a shaping function (Step 55). An exemplary shaping function is illustrated in FIGS. 9–10, with FIG. 9 showing the shaping function unit impulse response in the time (sample space) domain and FIG. 10 illustrating the frequency response (in the frequency domain) of the same shaping function. As shown, the shaping function is made up of about 48 samples. The shaping function is a sequence which describes the approximate spectral confinement to which the 48 waveforms or sequences of the basis set must adhere. This function is represented as a unit impulse response as shown in FIG. 9, with a corresponding sample interval as shown (each interval of time being about 1/1.536 MHz or less than 800 nanoseconds between samples). The sample interval of the shaping function is the same as the sample interval for the waveforms in certain embodiments. The length of the shaping function varies according to the complexity of the desired bandwidth shaping requirements. The shaping function may be determined by way of a variety of numerical techniques such as, e.g., the algorithms of frequency sampling, bilinear transformation, and equiripple approximation. The shaping function shown in FIGS. 9–10 was determined by the method of frequency sampling.

A significant characteristic of the frequency response of the shaping function as shown in FIG. 10 is a region of attenuation or null between two separate and spaced-apart passbands 57 and 59. Passbands 57 and 59 are centered approximately 150 kHz away from a spectral center of 384 kHz, each passband being from about 75–150 kHz wide, most preferably about 100 kHz wide with tails out to about 150 kHz. Thus, each passband may extend from about 100 kHz away from the center frequency to about 250 kHz away from the center frequency (See FIG. 19A). The null between passbands 57 and 59 of the shaping function provides a location for the analog FM signal carrier. Alternatively, any type of known colored interference may be disposed between lobes 57 and 59. This void region between passbands 57 and 59 permits the rejection or extraction of the analog FM interference under modulation centered about the center frequency by the digital processing portion of the receiver. In analog FM applications, substantially the entire analog signal is disposed between and spaced from passbands 57 and 59.

Figure 11:
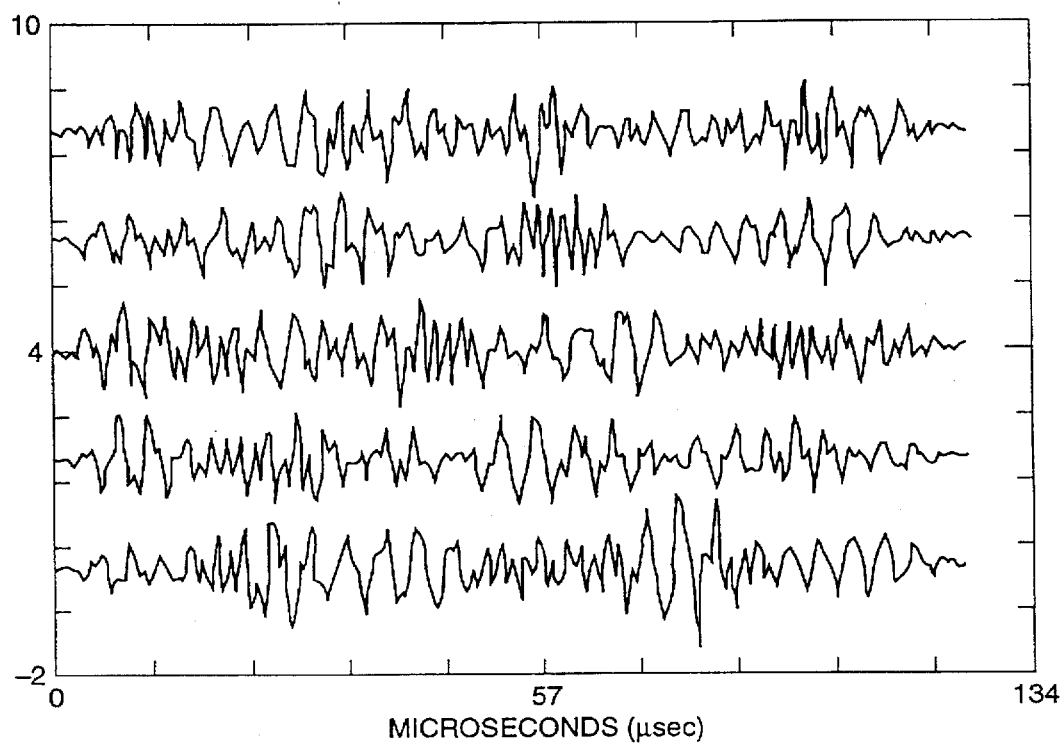
FIG. 11 is a graph illustrating the random number sequences of FIG. 8 after spectral shaping by the impulse response of FIG. 9 according to the first embodiment.

According to the invention, each sequence of the set of 48 (FIG. 8) is mathematically convolved with the shaping function unit impulse sequence (FIG. 9) in order to generate the spectrally shaped set of 48 sequences, five of which are represented as waveforms in sample space in FIG. 11. This convolving function is a point-by-point multiply and add type process. The spectra with respect to frequency of five of the now shaped random number sequences is roughly depicted in FIG. 12 (a computer plot being necessary to accurately reproduce the actual shape). While the 48 (five of which are shown) sequences or waveforms now satisfy desired spectral compliance, they still have poor crosscorrelation properties. In other words, after spectral shaping of the FIG. 8 sequences, the sequences are not mutually orthogonal, although they do have good autocorrelation values.

Figure 12:
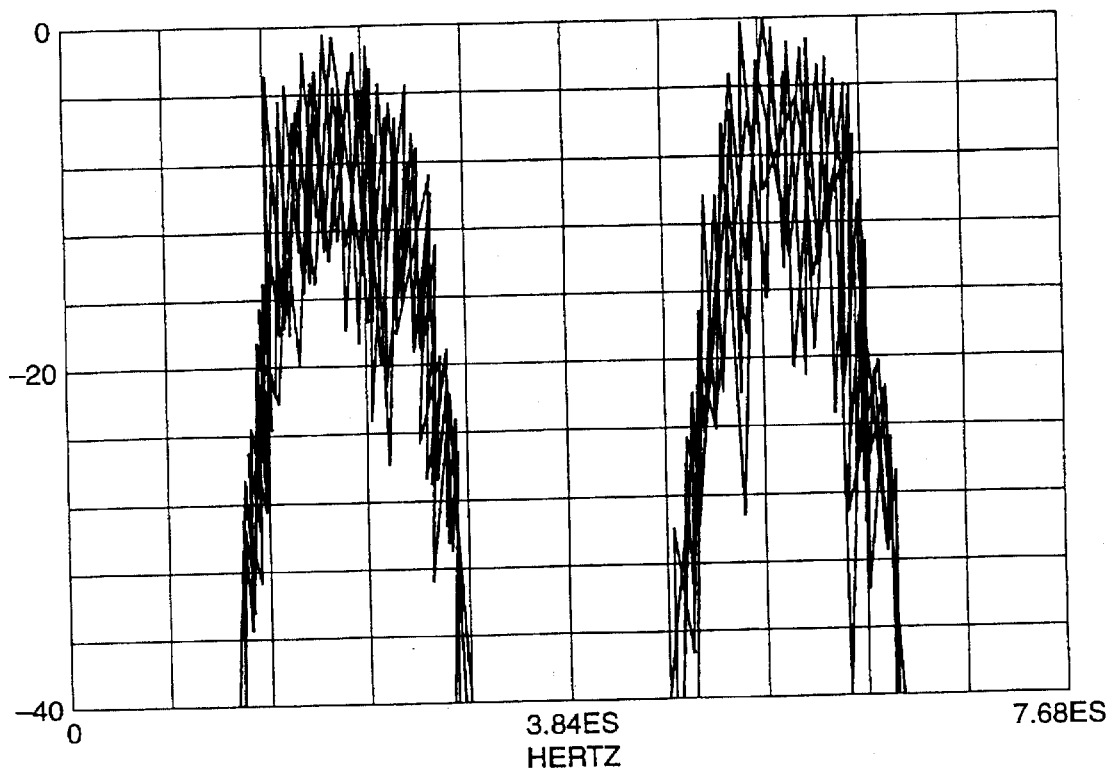
FIG. 12 is a graph illustrating the frequency response of the spectrally shaped sequences of FIG. 11 according to the first embodiment.
Figure 13:
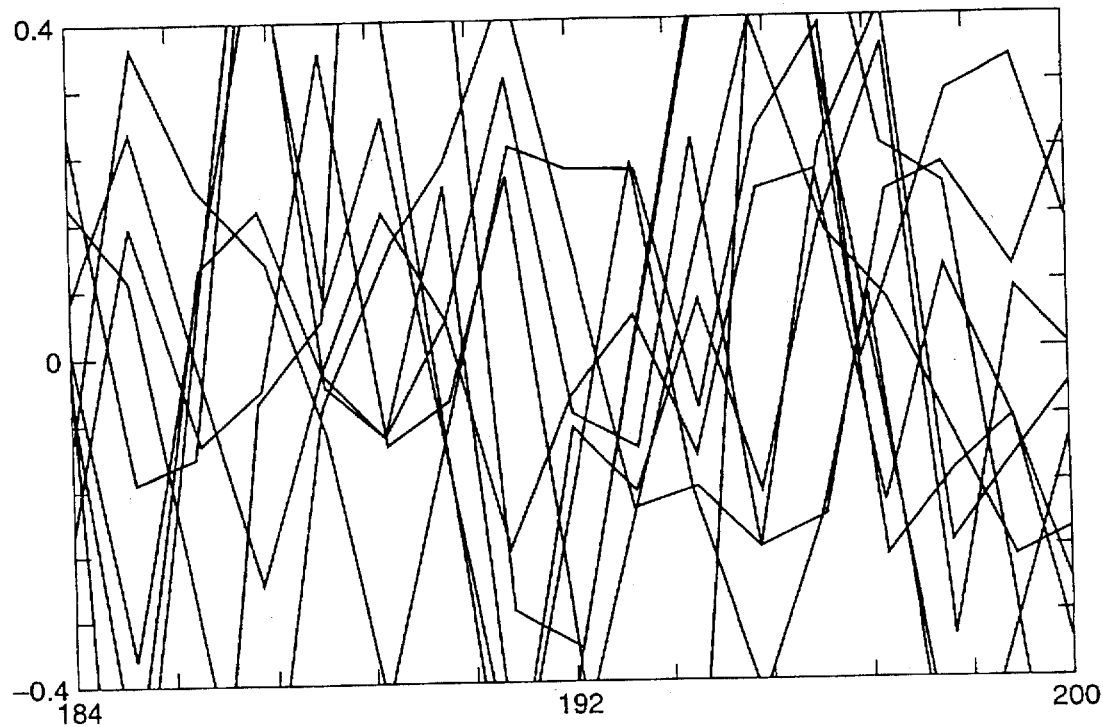
FIG. 13 is a graph illustrating the crosscorrelation or orthogonality characteristics of the spectrally shaped sequences or waveforms of FIGS. 11–12 according to the first embodiment.

FIG. 13 depicts in sample space a series of waveforms showing less than desirable crosscorrelation characteristics of the spectrally shaped sequences of FIGS. 11–12. If these signals were orthogonal (which they are not), all crosscorrelation terms arising from waveforms other than a single one of interest would be about zero at a specific sampling point. This clearly is not the case in FIG. 13.

Figure 14:
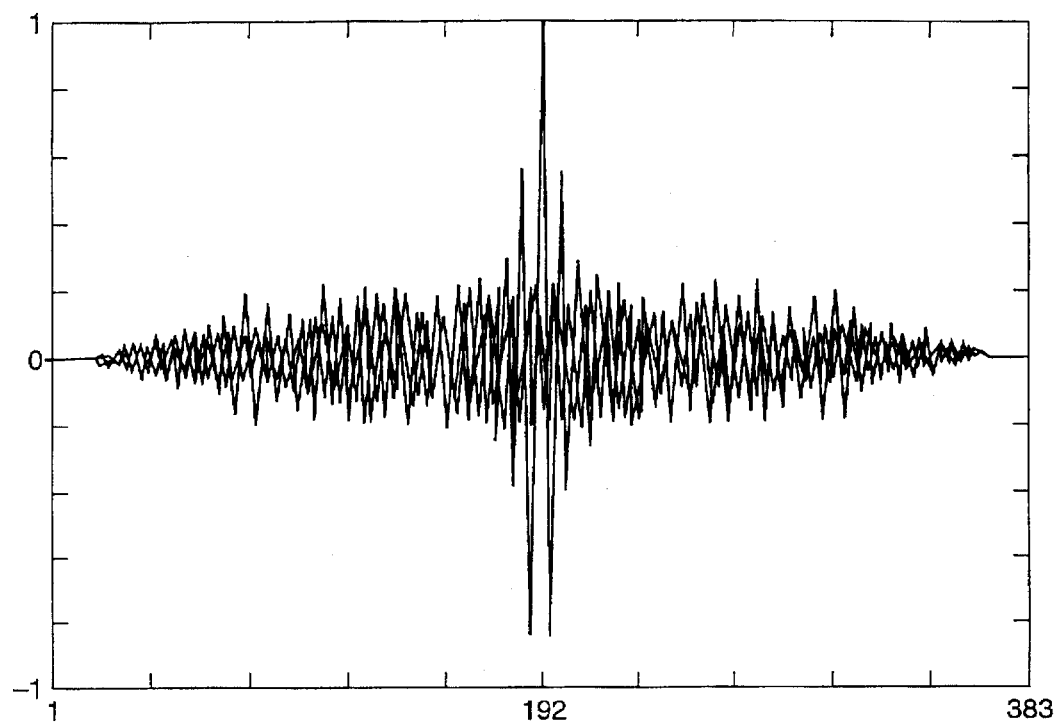
FIG. 14 is a graph illustrating the autocorrelation characteristics of the spectrally shaped sequences of FIGS. 11–12 according to the first embodiment.

FIG. 14 illustrates the satisfactory autocorrelation characteristics of the five of the 48 individual sequences shown in FIGS. 11–12. As illustrated, the shaped sequences have autocorrelation values which are at a maximum near about zero offset, and at a minimum at substantially all positive and negative time shifts. Thus, the now spectrally shaped sequences must be improved with respect to their crosscorrelation values.

In order to improve the crosscorrelation characteristics of the spectrally shaped waveforms, five of which are shown in FIGS. 11–12, the sequences or waveforms are decomposed by way of a process called singular value decomposition (SVD). This process, also known as Principal Components Analysis, is described in Numerical Recipes: The Art of Scientific Computing by William H. Press, copyright 1986, pp. 52–64, the disclosure of which is hereby incorporated herein by reference, but which is explained herein. SVD is based upon the theorem that any M×N matrix A, whose number of rows M is greater than or equal to its number of columns N, can be written as the product of: an M×N matrix U, an N×N diagonal matrix W with positive or zero elements, and the transpose of an N×N orthogonal matrix V, with matrices U and V being column-orthonormal. The shapes of these matrices are illustrated as follows:

$$[A] = [U] * \begin{vmatrix} w1 & & \\ & w2 \ldots & \\ & & wN \end{vmatrix} * [V^T]$$

The SVD process is performed on an arbitrary matrix A, replacing it by U and returning matrices W and V separately. A preferred computer program to perform this transformation, known as SVDCMP, is based on a program by Forsythe et al. which is in turn based on the original routine of Golub and Reinsch found in various forms in Wilkinson and Reinsch, in UNPACK, and elsewhere. These references, which are readily available to those of skill in the art, include extensive discussions of the algorithm. In applying the SVD process to the spectrally shaped waveforms of FIG. 11 (and the other 43 waveforms), an oversampled or overdetermined matrix A is constructed by arranging the spectrally shaped waveforms generated by generator 37 as columns of the matrix A, matrix A having M rows and N columns where the number of rows M generally being greater than the number of columns N (Step 57, FIG. 7). Accordingly, the number of rows M represents the number of samples in a baud (or sequence), and the number of columns N represents the number of sequences or waveforms. After constructing matrix A in such a manner, the matrix is decomposed via SVD into the product of three additional matrices: U, W, and V (Step 59).

$$A_{M,N} = U_{M,N} W_{N,N} V_{N,N}^T$$
where $$A_{M,N} = \{a_1^T a_2^T \ldots a_N^T\}, a_1 = \{a_1 a_{21} \ldots a_{M1}\}$$
$$U_{M,N} = \{u_1^T u_2^T \ldots u_N^T\}, u_1 = \{u_1 u_{21} \ldots u_{M1}\}$$
$$V_{N,N} = \{V_{1T} V_2^T \ldots V_N^T\}, v_1 = \{v_1 v_{21} \ldots v_{M1}\}$$

-continued $$W_{N,N} = \begin{Bmatrix} W_1 & 0 & \ldots & 0 \\ 0 & W_2 & \ldots & 0 \\ 0 & 0 & \ldots & W_N \end{Bmatrix}$$

$<u_i u_i> = 1, <u_i u_j> = 0$
$<v_i v_i> = 1, <v_i v_j> = 0$

The decomposition of matrix A by using SVD creates matrix U which possesses M rows and N columns (matrix U is the same size as matrix A), wherein the columns of matrix U are orthogonal in pairs. In other words, the left-most 48 columns of newly formed matrix U represent the basis set of sequences or waveforms in the first embodiment, these sequences all being substantially mutually orthogonal. Furthermore, each column of matrix U has unit vector norm (orthonormal).

The left-most 48 columns of matrix U are sequences that represent the basis set of desired waveforms being mutually orthogonal, spectrally shaped, and having good autocorrelation values. Additional matrices W and V may be disregarded. The crosscorrelation/autocorrelation ratio of these waveforms is less than about 0.003, and more preferably less than about 0.001. Because the number of columns N in matrix u is typically greater than the number of waveforms or channels (e.g., 48) required for the basis set, only as many columns as needed are selected, starting with the left-most column of matrix U and proceeding to the right. In the event that there are insufficient degrees of freedom due to a small time-bandwidth product, some waveforms, particularly those toward the right-most column of matrix U, may not satisfy the spectral confinement requirement of the desired application. In such a case, it may be necessary to alter the shaping function or increase the baud interval.

Figure 15:
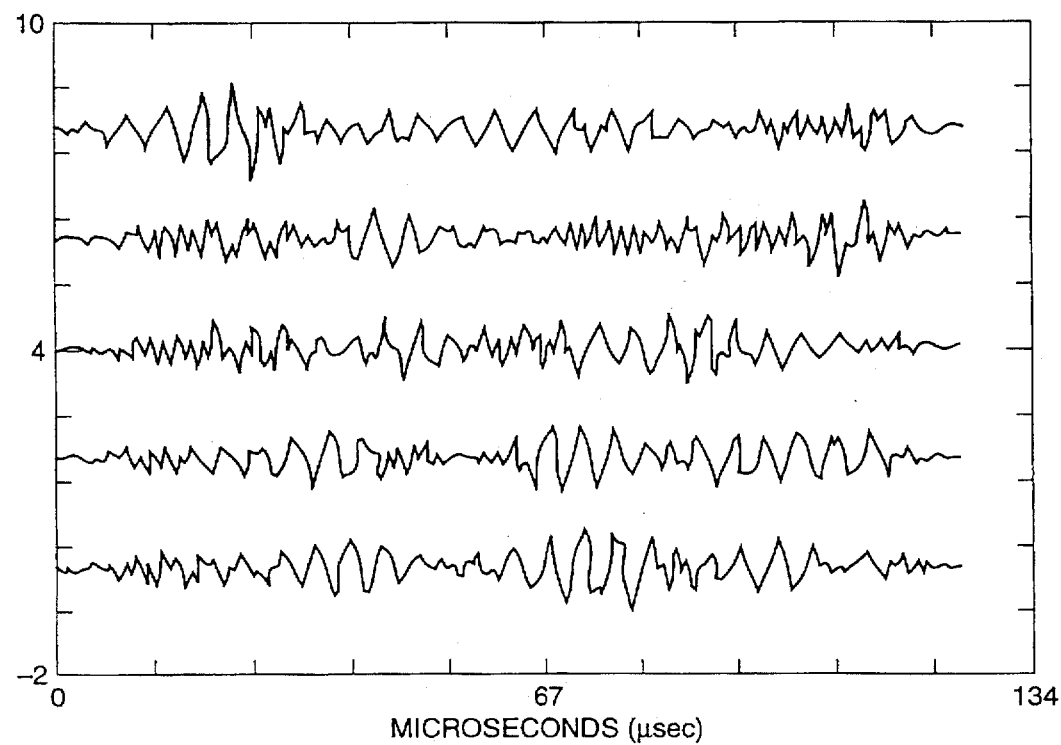
FIG. 15 is a graph illustrating the determined spectrally shaped, orthogonal sequences or waveforms after SVD matrix decomposition according to the first embodiment.
Figure 16:
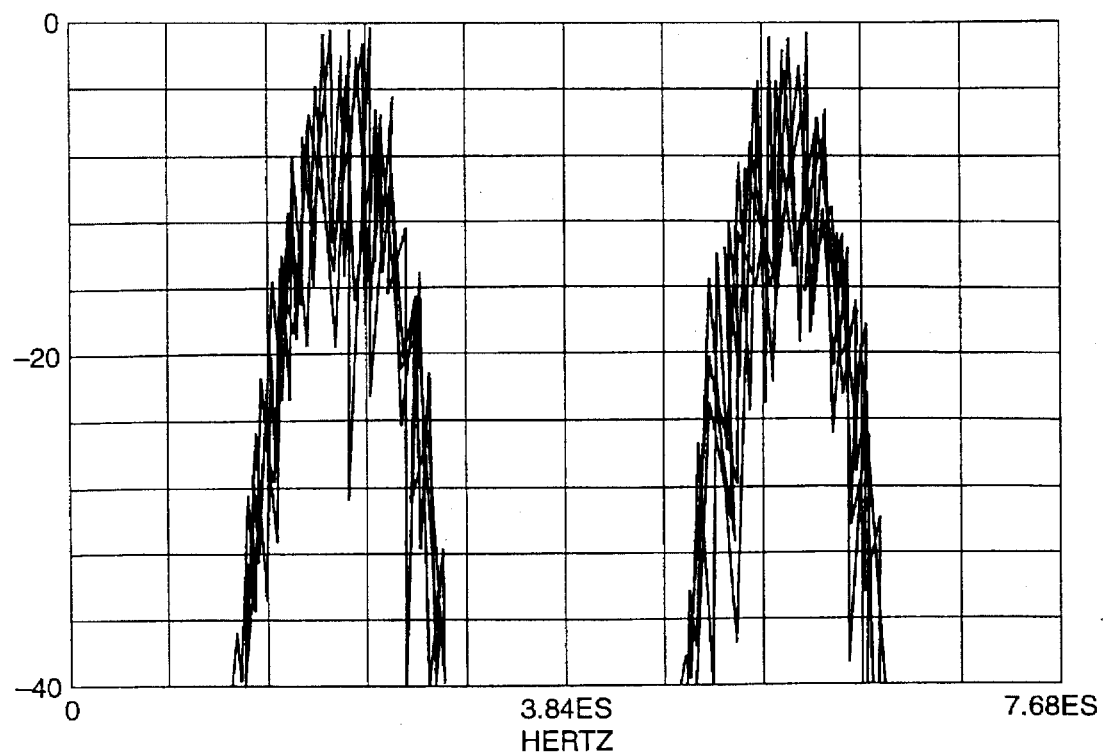
FIG. 16 is a graph illustrating the frequency response of the sequences or waveforms of FIG. 15 after SVD decomposition according to the first embodiment.

FIG. 15 illustrates five of the spectrally shaped sequences of FIG. 11 after they have been decomposed via SVD as described above. The set of 48 wideband waveforms are orthogonal, spectrally shaped, and have good autocorrelation properties. The frequency responses for the five waveforms of FIG. 15 are illustrated in the graph of FIG. 16. As shown, the decomposition of the waveforms via SVD, while providing good crosscorrelation characteristics to the basis waveform set, did not adversely affect its spectral or autocorrelation characteristics.

Figure 17:
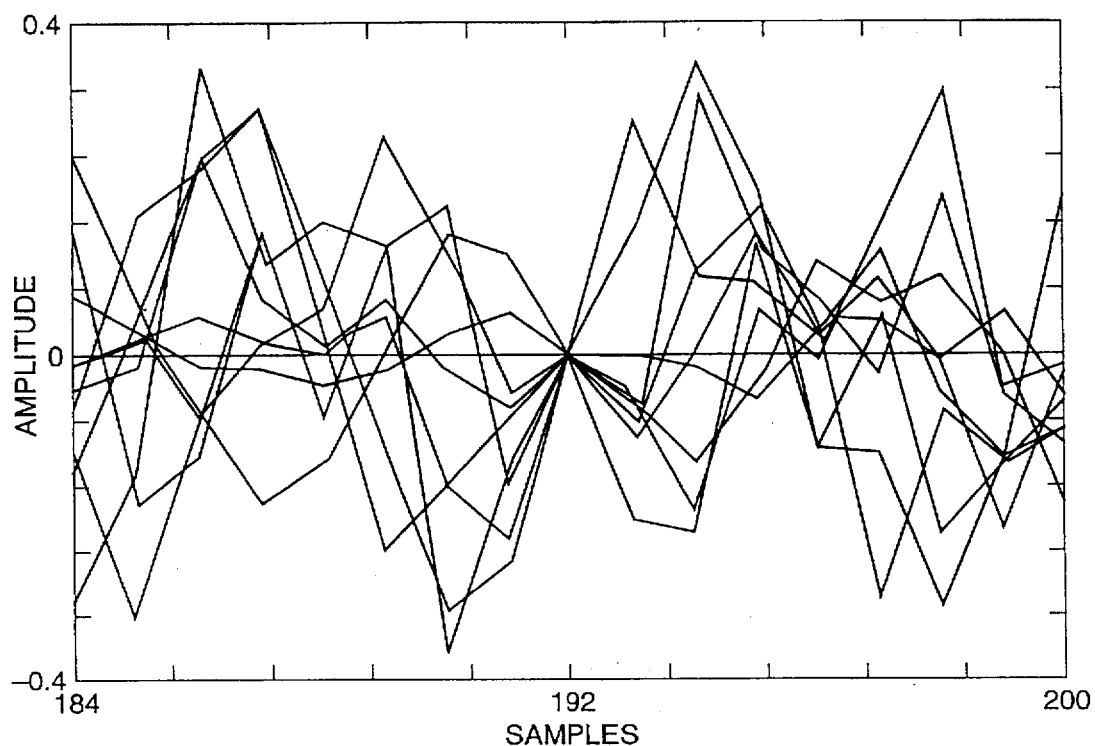
FIG. 17 is a graph illustrating the cross correlation characteristics of the sequences or waveforms of FIGS. 15–16 according to the first embodiment.

FIG. 17 illustrates the desired crosscorrelation (or orthogonality) characteristics according to the invention of the basis SVD decomposed sequences, illustrated as waveforms, for the sequences shown in sample space and in the frequency domain of FIGS. 15–16. Significantly, the crosscorrelation sequences at the sampling point 192 are all near zero, thereby illustrating the orthogonal properties of the sequences of FIGS. 15–16. While the 48 waveforms in the output from generator 37 are substantially orthogonal at the sampling point, they often are not perfectly orthogonal due to noise and limited A/D converter resolution in practical embodiments. As shown, for wideband signals, the crosscorrelation can only be near zero near the sampling point and not at all points in time because of the common frequencies occupied by the wideband signals or carriers.

Figure 18:
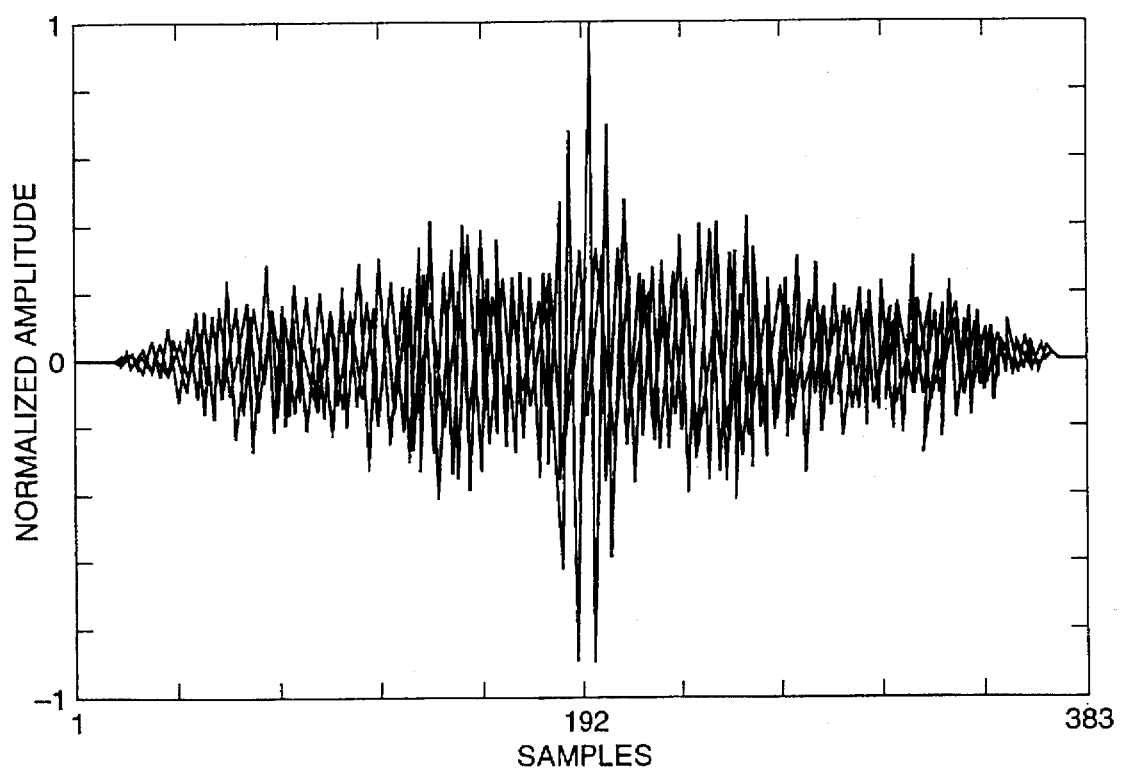
FIG. 18 is a graph illustrating the autocorrelation characteristics of the sequences or waveforms of FIGS. 15–17 according to the first embodiment.

FIG. 18 illustrates the autocorrelation values of the five sequences illustrated in FIG. 15. The values are excellent in that the autocorrelation is at a minimum for both positive and negative time shifts and at a maximum for about zero offset. Thus, it has surprisingly been found that the application of singular value decomposition (SVD) to spectrally shaped nonorthogonal waveforms such as in FIG. 11 results in a basis set of sequences which are substantially orthogonal while the spectral shaping and autocorrelation values are maintained throughout the application of SVD. Although SVD has been used in the past in the solution of least squares problems, it has never to the best of the instant inventors' knowledge been utilized for determining signal waveforms in data communication applications.

The crosscorrelation/autocorrelation ratio may be used to define good or satisfactory autocorrelation and crosscorrelation. This ratio herein relates to the performance of channel(s) in realistic hardware implementations because while the mathematical crosscorrelation characteristics are perfect, they are typically physically unrealizable because they would require infinite precision to satisfy such perfection. In an embodiment of this invention, for BPSK data modulation, the probability of error is (reference: Lindsey, W. C., and M. K. Simon, *Telecommunication Systems Engineering*, 1973):

$$P_e \leq Q\left[\sqrt{\frac{2E}{N}}\right]$$

where E is the bit energy and N is the noise energy. In certain embodiments herein, the measured P is less than about $1 \times 10^{-8}$ in the absence of noise other than the channel-to-channel interference. Through iterative solution of the equation, E/N is thus found to be no less than 16. E may be considered the peak autocorrelation sum of any basis waveform (its energy), while N is the additive crosscorrelation contributions of each of the remaining 47 basis sequences which are acting as sources of interference. Hence the crosscorrelation/autocorrelation (or cross/auto) ratio is less than 1/(16*47) or 0.001 for each waveform pair. In certain embodiments, a bit error rate of better than $1 \times 10^{-4}$ is maintained, this corresponding to a maximum cross/auto ratio of about 0.003. Thus, the systems according to certain embodiments of this invention have cross/auto ratios of less than about 0.003 and preferably less than about 0.001. The crosscorrelation characteristics typically dominate channel performance because the 48 channels act as source of interference with respect to each other. In the absence of MP, autocorrelation is not as important, autocorrelation primarily reflecting the "whiteness" or broadness of the frequency content of the basis waveforms.

FIGS. 7–18 illustrate the generation of a basis wideband waveform set by basis sequence or waveform generator 37. Without further encoding, the 48 basis waveforms of each set representing different symbols would not vary from baud to baud, hence only a constant bit sequence would be communicated because the same set of 48 waveforms are output each baud. Thus, the basis waveform shapes making up the set must be modified or modulated in a data dependent manner for use in the communication system of the first embodiment.

Modulator/multiplier 39 of FIG. 2 modulates the incoming basis waveforms output by generator 37 in a data dependent manner in accordance with the digital data coming in at a rate of 384 kbit/sec from error correction encoder 35.

In order to maintain the desired properties of crosscorrelation, autocorrelation, and spectral shape, variable gain modulation, including the special cases of inversion (generally considered as phase modulation) and infinite attenuation, is utilized by modulator 39. Thus, modulator 39 may apply, for example, binary phase-shift-keying (BPSK) or M-ary orthogonal modulation to the basis waveforms in certain embodiments. For the two-level case of phaseshift-keying (PSK or BPSK), one state represents the binary "1" and the other state a binary "0." For multilevel or M-ary systems, there are more than two levels or states, usually a multiple of two, with a few exceptions such as partial response systems, duo-binary being an example.

Phase modulation such as PSK or BPSK uses one phase of the carrier frequency or waveform for one binary state, and the other phase for the second binary state. The two phases are about 180 degrees apart in certain embodiments, and are detected at the receiver by a synchronous detector using a reference signal at the receiver which is of known phase with respect to the incoming signal.

Alternatively, offset quaternary phase-shift keying (OQPSK) modulation may be performed at modulator 39. OQPSK is based upon the 90 degree carrier phase 4 separation of two sets of sequences, so the two sequences are interleaved in time. One set of sequences is denoted as the in-phase set, and the remaining sequences are denoted as the quadrature set. When OQPSK is used, a reduced set (e.g., 24) of basis sequences is generated by generator 37 by considering only one-half the spectrum. Hence, the spectral shaping function is considered symmetric about a midpoint, which is translated to zero frequency. For example, in certain embodiments, the shaping function is degenerated to a single passband 100 kHz wide and centered about 150 kHz away from zero frequency. The in-phase waveforms are defined from the basis set waveforms, and the quadrature waveforms are constructed by time-reversing the in-phase waveforms. However, they may also be identical to the in-phase waveforms.

In the first embodiment of this invention, waveform generator 37 outputs an orthogonal basis set of 48 waveforms or sequences to modulator 39 at a baud rate of about 8 kbit/sec, each sequence or waveform of the set being unique and representing a different channel or carrier. At modulator 39, the 48 waveforms are each individually multiplied by either a positive 1 (+1) or a negative 1 (−1) in the bi-valued phase modulation process, a sequence multiplied by +1 representing a binary 1 and a sequence multiplied by −1 representing a binary 0.

After being modulated in modulator 39 so that each waveform in the set represents either a binary 1 or 0, all 48 waveforms making up the baud are combined at summer 43 with a wideband reference signal to be described below. Thereafter, generator 37 again outputs the same 48 basis sequences to modulator 39, which modulates this newly sent baud in the same manner. Thus, a substantially continuous flow of bauds (each baud including 48 data channels or carriers) is output from modulator 39 to summer 43, with the 48 signals of each baud along with a reference signal from generator 41 being combined and thereafter forwarded to digital-to-analog converter 45.

When modulator 39 of the first embodiment receives a waveform from generator 37 and is instructed by the incoming digital data to modulate this waveform to represent a binary zero, modulator 39 multiplies all 192 samples of this waveform by −1 and thereafter sends the modulated waveform to summer 43. Thus, the actual shapes of the waveforms received from generator 37 are not changed in modulator 39, only their polarity is changed.

Once a satisfactory set of 48 waveforms has been determined (by SVD), the set is stored in generator 37 and is repeatedly generated and output. In a similar manner, reference signal generator 41 determines a satisfactory signal and repeatedly outputs the same stored wideband reference signal to summer 43 for each baud.

The wideband reference signal output by generator 41 is unmodulated, and is not related to the data signals output from modulator 39. The reference signal is a waveform which also possesses characteristics resembling noise, being composed of the summation of all of the basis functions (e.g., 48), each basis function having either a positive or negative polarity determined arbitrarily in certain embodiments.

The reference signal is the same for every baud, and satisfies the bandwidth occupancy determined by the system. The reference signal is scaled down in amplitude with respect to the modulated waveforms of each baud. To generate the reference signal, an arbitrary binary value is picked for each of the 48 basis waveforms in the particular set output from generator 37, these modulated waveforms then being summed together to represent a composite signal. The composite signal is then attenuated so as to represent from about one-quarter to one-half the amplitude of each of the 48 signals emitted from modulator 39. The crosscorrelation of the reference signal is about 1/48 for any one waveform in the signal set.

There is a trade-off associated with reducing the amplitude of the reference signal. Increasing reference signal power reduces the number of averages required in the receiver which thereby makes it possible to use a faster equalizer. The nominal trade-off in certain embodiments is about 50 averages and about one-half reference signal power or amplitude with respect to the amplitude of the modulated waveforms.

Because multipath (MP) and colored interference may impact some channels more than others, the reference signal is composed of all 48 channels. The reference signal is constant in every baud, so that it must be subtracted from each baud at the receiver before the demodulation step is performed.

While the selection of polarity for each channel or carrier in making up the reference signal is somewhat arbitrary when BPSK modulation is used, such is not the case with M-ary or on-off modulation. The composite digital signal output from summer 43 is converted to analog by D/A converter 45. Alternatively, 48 separate and distinct digital-to-analog converters may be disposed immediately after modulator 39, and summer 43 would then be of the analog type.

The signal output from D/A converter 45 is at an intermediate frequency (IF) of about 384 kHz in the first embodiment. The frequency of the signal is moved up to the desired final FM frequency by way of upconverter 47 and local oscillator (LO) 49. This upconversion is an analog process performed on the combined 48 data channels and reference signal of each baud. After being upconverted, the signal is linearly amplified via amplifier 51, and forwarded to FM and digital signal summer 9.

Signal summer 9 linearly combines the analog FM signal output from clipping amplifier 27 with the digital data signal output from linear amplifier 51. After being linearly combined at summer 9, the composite FM/digital signal is sent to transmitting antenna 29 for broadcast through atmospheric-free space to a plurality of receivers 3.

Figure 19A:
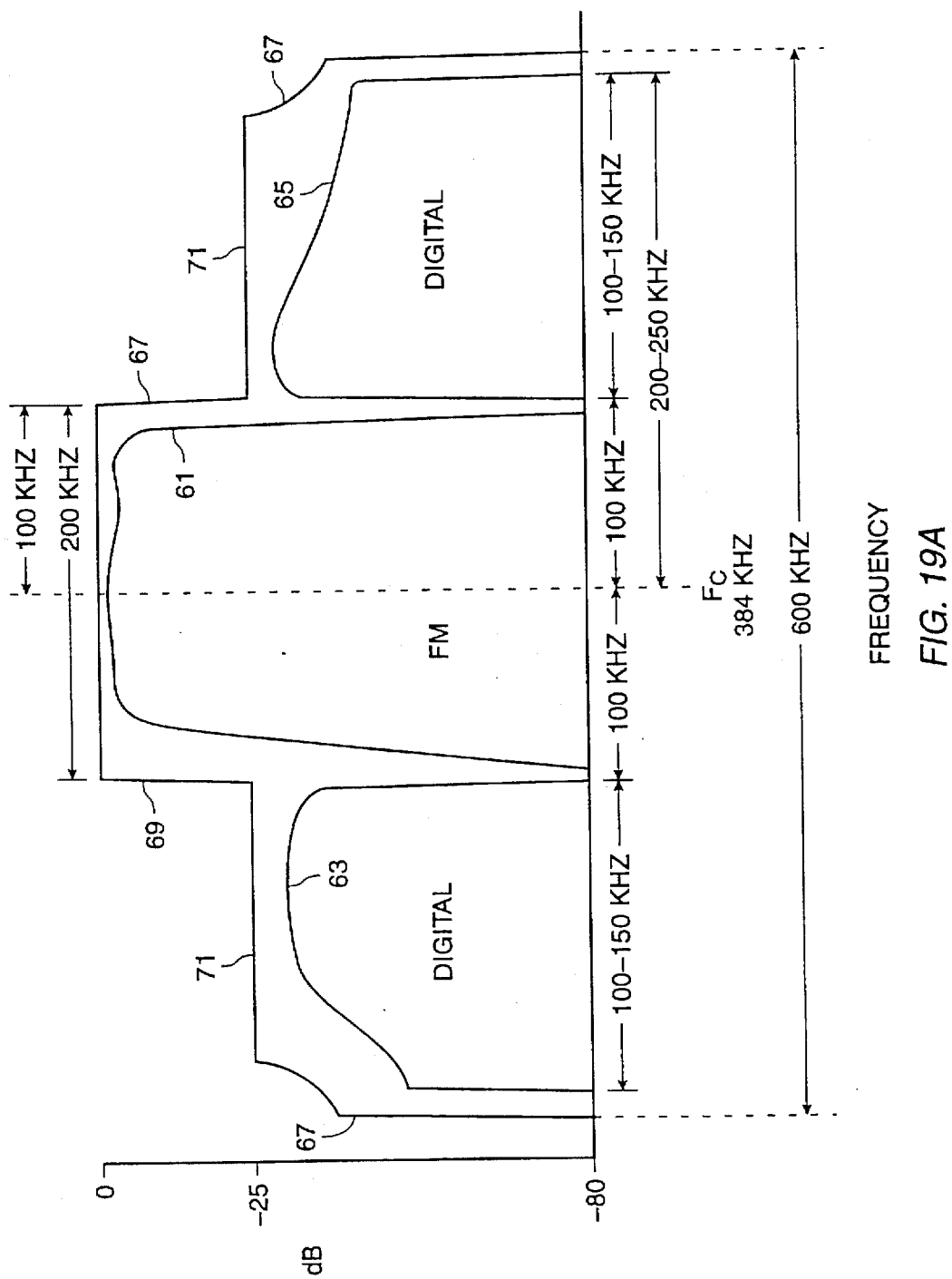
FIG. 19A is a spectral diagram illustrating the spectral allocation of the digital and analog FM signals as linearly summed and transmitted over atmospheric free space according to the first embodiment.

FIG. 19A is a graph illustrating the spectral allocation of the composite FM/digital signal. As shown, analog FM signal 61 (or other type of colored interference present in other embodiments) is substantially centered about the center frequency, FM signal 61 being surrounded on either side by digital passband signals 63 and 65 made up of the modulated waveform set. While passbands 63 and 65 are illustrated as being substantially symmetrical, this need not be the case.

Spectral mask 67 defines the spectral limitations within which the composite FM/digital signal must stay, mask 67 being about 600 kHz wide and 80 dB deep in this embodiment. Mask 67 includes a central peak portion 69 and a pair of guardbands 71 immediately adjacent the central portion. Guardbands 71 are side areas where low level conventional analog FM signals are typically disposed because the typical analog FM signal cannot be attenuated in 0 bandwidth, mask 67 being a typical analog FM mask. As shown, guardbands 71 start out at about −25 dB from peak power and about 100 kHz away from the center frequency.

Because typical analog FM broadcasting stations generally do not utilize guardband portions 71 of mask 67, the digital signals of the first embodiment are spectrally shaped so as to be disposed within these guardband areas. Digital signals (or lobes) 63 and 65 are of significantly reduced amplitude as compared to FM signal 61 due to their positions in the guardband areas in this embodiment, each of the 48 different symbol waveforms in each baud representing portions of signals 63 and 65.

While many of the functions of the aforediscussed transmitter elements may be carried out via the first embodiment transmitter and software attached hereto via microfiche, such functions may also be carried out using hardware of a second embodiment. FIG. 19B is a hardware block diagram of a transmitter according to a second embodiment. The signal in this embodiment is directly modulated at the final RF carrier frequency by sending the samples from the MAC 191 to two D/A converters 197 in alternating succession (i.e., one for the I D/A converter, the next for the Q D/A converter, etc.) and using a hybrid I/Q modulator.

Figure 19B:
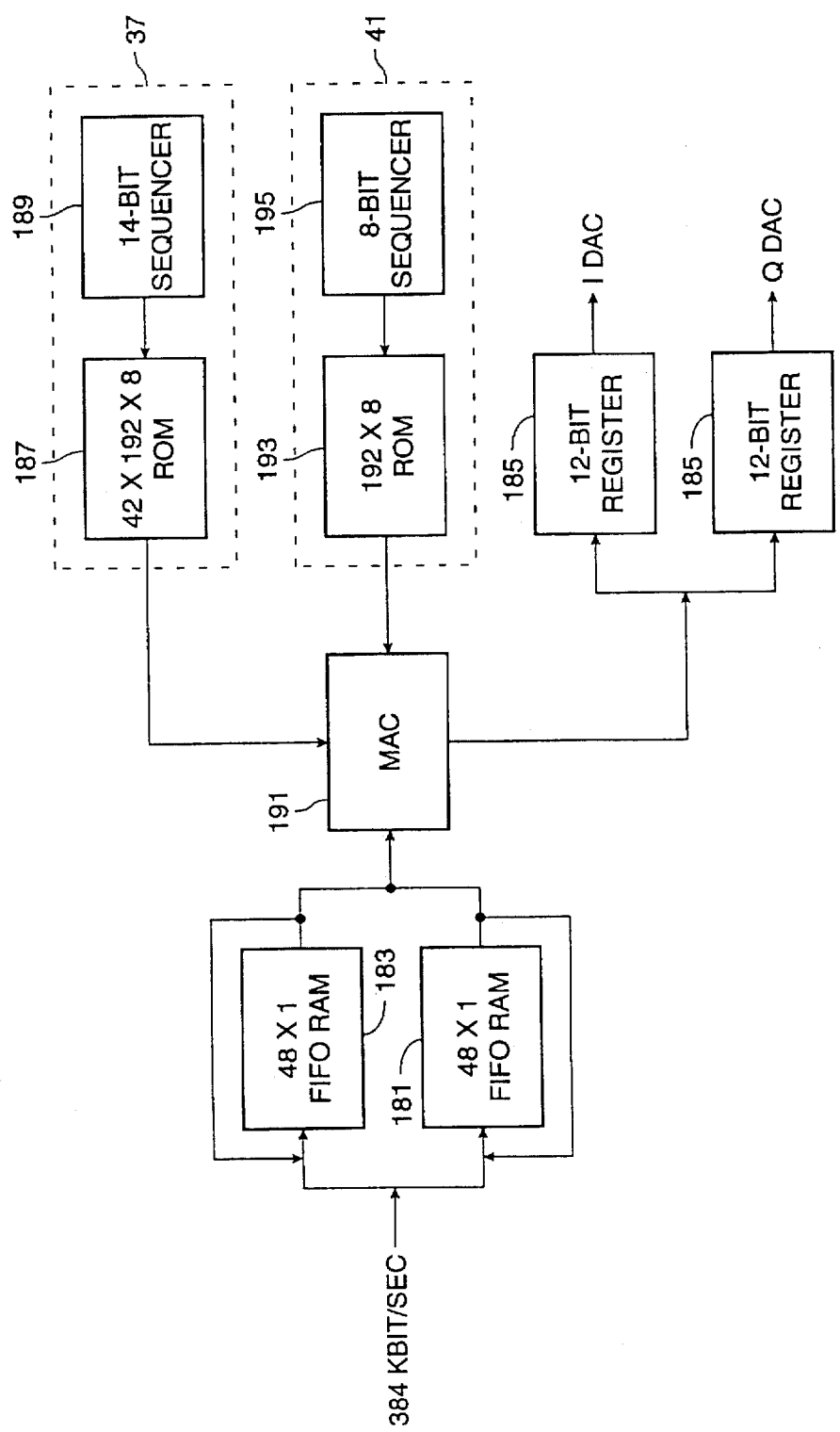
FIG. 19B is a block diagram of a portion of the transmitter according to a second embodiment.

In FIG. 19B, the input bit stream is at about 384 kHz and is a combination of MUSICAM compressed digital audio from compressor 33 and ECC from encoder 35. This bit data is read into one of two 48 bit FIFO 48×1 RAMs 181 and 183. The total throughput at registers 185 is about 1.536 MHz which corresponds to the basis waveform sample interval. This throughput is implemented with in-phase (I) and quadrature (Q) D/A converters (not shown) to which the samples are alternatively sent in succession (i.e., one for the I D/A converter, one for the Q D/A converter, next for the I, etc.). The above-discussed basis orthogonal waveform set of 48 different sequences is stored in ROM 187 which is indexed column by column with a modulo 9216 address sequencer 189. Thus, the first 48 matrix elements indexed correspond to the first sample of each basis waveform. The value of each of the 48 data bits must be accessed 192 times (corresponding to the number of samples in a baud or waveform) in a single baud to generate the modulated waveforms. Therefore, RAMs 181 and 183 are accessed/read in a circular fashion. A master crystal 6.144 MHz clock generator (not shown) is divided down to generate the 384 kHz bit clock, the 1.536 MHz sample clock, and the 768 kHz D/A converter clocks.

Modulation is done in MAC 191 which may be operated as an additive or subtractive accumulator. MAC 191 is fast enough to complete 48 MACs in a sample interval (i.e., about 1.536 MHz), otherwise multiple MACs are required which may be the case in certain embodiments. At the start of each sample interval, MAC 191 is preloaded with the value of the reference signal for that sample, the wideband reference signal discussed above being stored in ROM 193 and indexed with modulo 192 counter 195. The pointer to ROM 193 is reset at the start of each baud to the first sample in the ROM 193 so as to index the first value for the reference signal.

For each of the 48 data bits in RAMs 181 and 183 corresponding to the previous baud, if the incoming bit is a 0 the indexed value of ROM 187 which represents a channel waveform sample is subtracted from the current value. However, if the data bit is a 1, the indexed sample value of ROM 187 is added to the current value. After 48 MACS, the contents of the accumulator represent the complete sample, i.e., the sum of modulated channel waveforms and reference signal. The contents are then latched into one of 12-bit registers 185, alternating from one sample to the next. Registers 185 are used to drive D/A converters 197 shown in FIG. 19C.

Figure 19C:
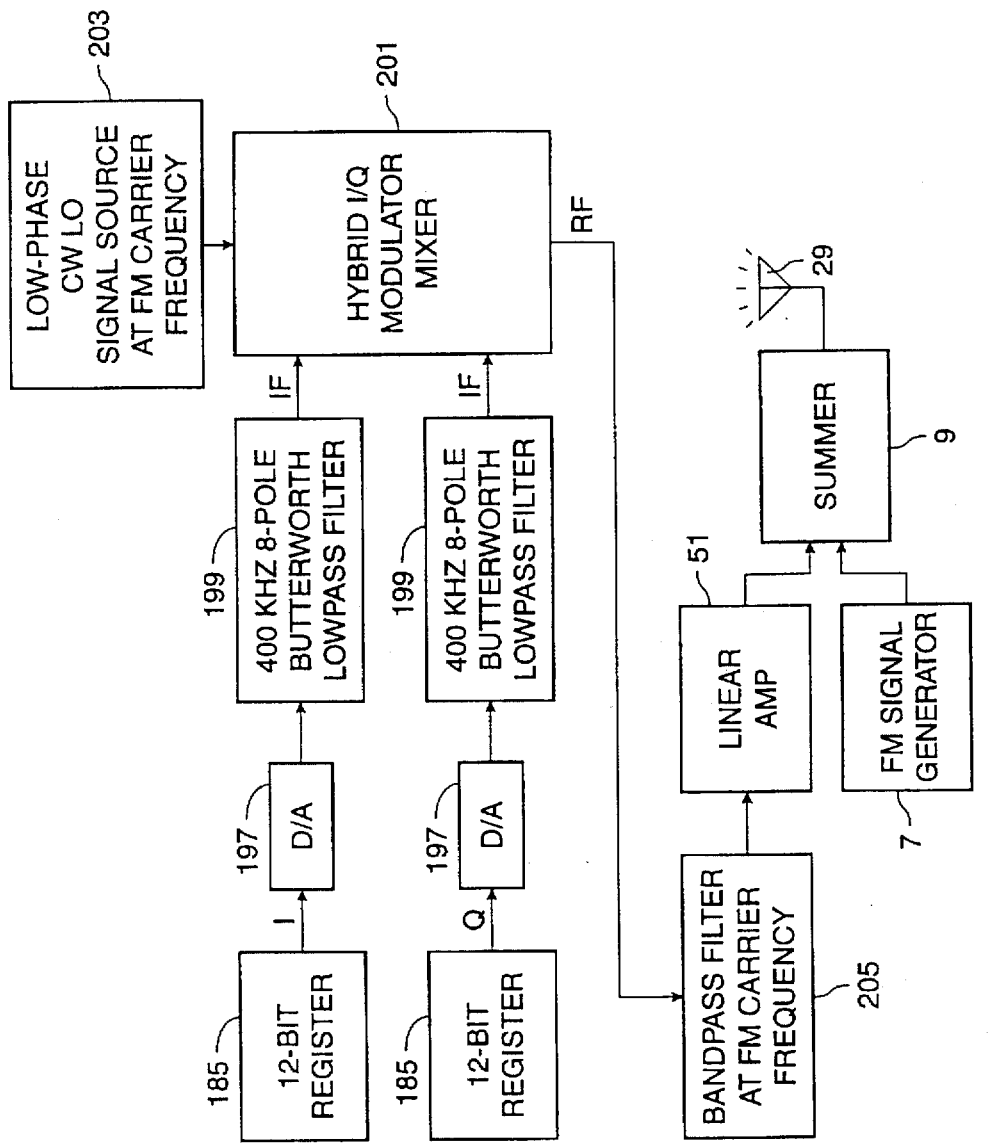
FIG. 19C is a block diagram of another portion of the FIG. 19B transmitter.

FIG. 19C is a hardware block diagram of certain analog digital signal generator components which may be used according to the FIG. 19B embodiment of the transmitter. The output of D/A converters 197 is filtered by 400 kHz 8-pole Butterworth lowpass filters 199. D/A converters 197 are used to drive hybrid I/Q modulator mixer 201, which may be a Minicircuits MIQA100 in certain embodiments.

Local oscillator source 203 for quadrature mixer 201 is of the high stability, low phase, CW type operating at the same frequency as the analog FM carrier. Bandpass filter 205 removes undesired sidebands and amplifier 51 is a linear power amplifier.

Figure 20:
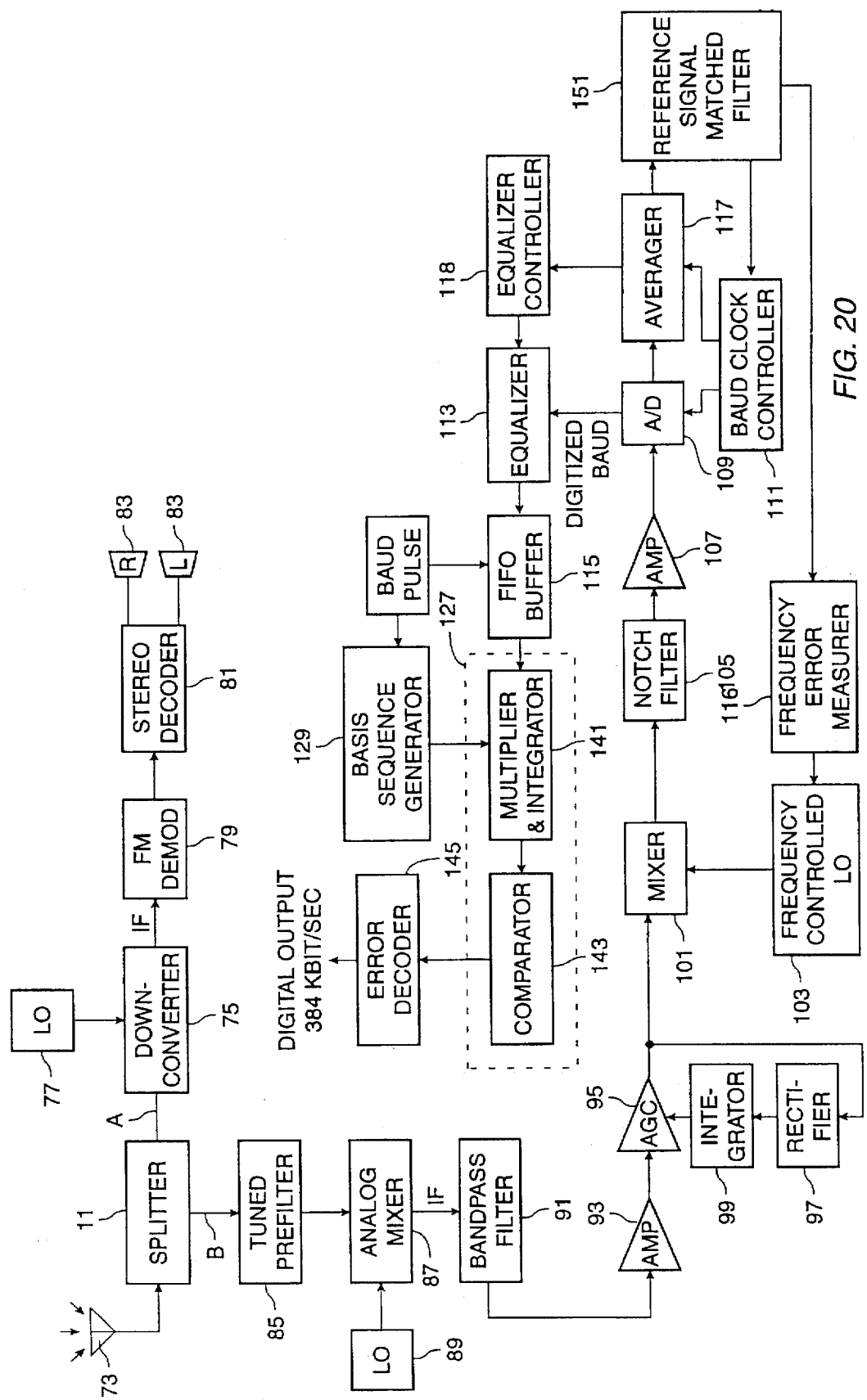
FIG. 20 is a block diagram illustrating the receiver of the first embodiment of this invention.

After being transmitted by way of antenna 29, the composite FM/digital signal, whose spectral allocation is shown in FIG. 19A for certain embodiments, is received by omnidirectional antenna 73 in receiver(s) 3 as best shown in FIG. 20. The received composite FM/digital signal is at an RF frequency in the frequency range from about 30–300 MHz and more preferably from about 88–110 MHz.

The incoming composite signal is split into two separate FM/digital paths, A and B, by splitter 11, the composite signal in path A being forwarded to the analog FM signal processing section of receiver 3 and the composite signal in path B being forwarded to the digital signal processing portion of the receiver.

With respect to signal path A, the analog FM signal of the composite is downconverted to a standard intermediate frequency (IF) by downconverter 75 and local oscillator 77. The output of downconverter 75 is forwarded to conventional frequency demodulator 79. The resulting signal is forwarded from demodulator 79 to conventional stereo decoder 81 for output via typical audio speakers 83.

Alternatively, the analog FM and digital FM portions of the receiver may share the same downconverter in certain embodiments, realizing, however, that the analog bandpass filter is generally more selective or narrow than the digital bandpass filter.

Splitter 11 outputs the other FM/digital signal via signal path B toward tuned prefilter 85 which makes the first attempt at separating the desired composite signal from interfering transmissions originating from other stations.

The low-noise amplifier of prefilter 85 amplifies a fairly weak FM signal level, approximately 20 dBF (dB-Femtowatts) in magnitude, to a level of −40 dBm where it may be processed readily by further circuits. This amplifier is linear in certain embodiments so as to preserve the digital signal.

The low-noise amplifier of prefilter 85 is followed by a high dynamic range diode-ring mixer 87 which frequency translates the FM/digital signal from the RF carrier frequency to a fixed intermediate frequency (IF) of about 10.7 MHz. The choice of IF is generally dictated by the availability of inexpensive IF bandpass filters and may, of course, vary with respect to the use of the system. Local oscillator (LO) 89 of mixer 87 is sinusoidal in nature, having a frequency which is the addition of the IF frequency and the desired RF carrier frequency. Local oscillator 89 is variable due to the requirement for tuning over the entire FM band, but once a station is selected, the frequency of LO 89 is generally not altered.

The signal at an IF of 10.7 MHz emitted from mixer 87 is forwarded to high order, 500 kHz wide bandpass filter 91 which is centered at the IF frequency. Bandpass filter 91 separates the composite FM/digital signal from possible nearby adjacents so as to limit the noise bandwidth of the system. The bandwidth of bandpass filter 91 is significantly wider than that employed in conventional FM receivers because it passes the digital signal which surrounds the analog FM signal, the opposing lobes 63 and 65 making up the digital signal in this embodiment being situated within guardbands 71 of FM mask 67.

The bandpass filter signal is then amplified by amplifier 93 and passed through automatic gain control (AGC) amplifier 95 so as to present a uniform signal level to the final downconversion circuits. The time constant of the AGC circuit, including rectifier 97 and integrator 99, must be significantly longer than the baud interval (about 125 microseconds in certain embodiments), but short enough to adapt to travel transients (less than about 10 milliseconds in certain embodiments).

The composite FM/digital signal is then sent to mixer 101 which is controlled by frequency controlled local oscillator 103. LO 103 controls the carrier frequency of the receiver.

Mixer 101 frequency translates the 10.7 MHz FM/digital intermediate frequency signal down to about a 384 kHz intermediate frequency (IF) FM/digital signal, the 384 kHz IF signal then being digitized and processed. The frequency of local oscillator 103 for mixer 101 is under direct control of the receiver in order to eliminate frequency offsets and to track Doppler frequency shifts as discussed later herein, this control being effected by focusing in on frequency shifts and not phase.

After downconversion, the signal is forwarded to triple-tuned notch filter 105 which is centered at about the 384 kHz intermediate frequency. Notch filter 105 substantially eliminates the analog FM component of the composite FM/digital signal, the analog FM component being irrelevant to reception and processing of the digital signal made up of lobes 63 and 65. Remaining portions of the analog FM signal which are not removed by notch filter 105 are suppressed by filtering within later stages of the receiver.

The resulting digital signal emitted from notch filter 105 is amplified by amplifier 107 to a level of about 200 mV in the absence of any interference, and is thereafter connected to analog-to-digital (A/D) converter 109 of receiver 3.

After the analog FM component has been removed, the signal is digitized with 10-bit analog-to-digital converter 109, sampling at approximately 1.536 MHz. The precise frequency of A/D converter 109 is controlled by the baseband or baud clock recovery voltage controlled oscillator within controller 111, the precise frequency of this oscillator/clock being controlled in order to accurately track the baud frequency of the transmitter.

The nominal amplitude presented to A/D converter 109 is chosen to allow for a nominal dynamic range of about 20 dB with about a 15–20 dB dynamic range overhead in order to combat adjacent channel and residual FM interference. Over-range recovery must be less than one microsecond ($\mu s$) in duration in certain embodiments so as to provide good performance in the presence of impulse noise.

Figure 21A:
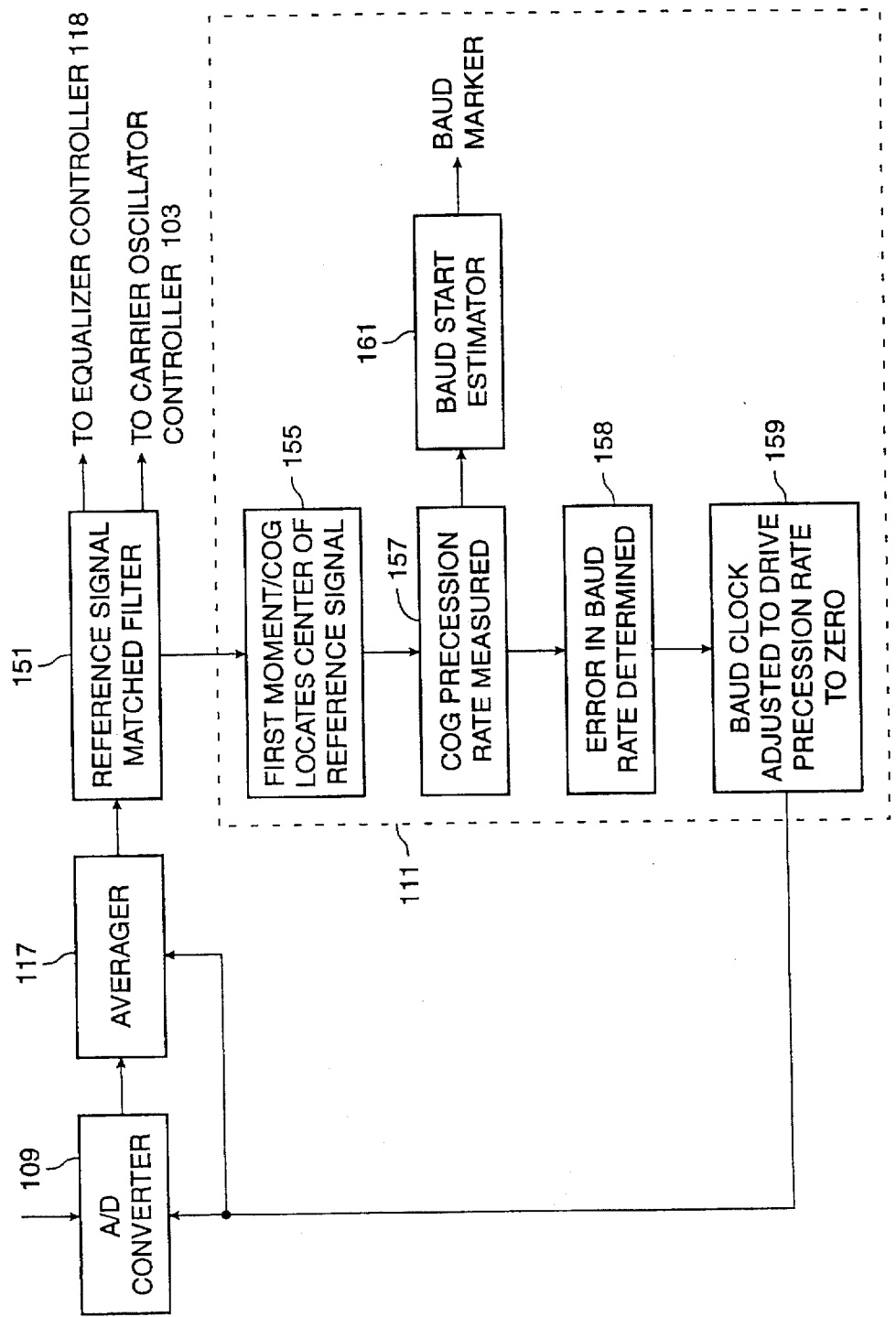
FIG. 21A is a block diagram/flowchart of the baud clock controller of the receiver for the first embodiment illustrated in FIG. 20B.
Figure 21B:
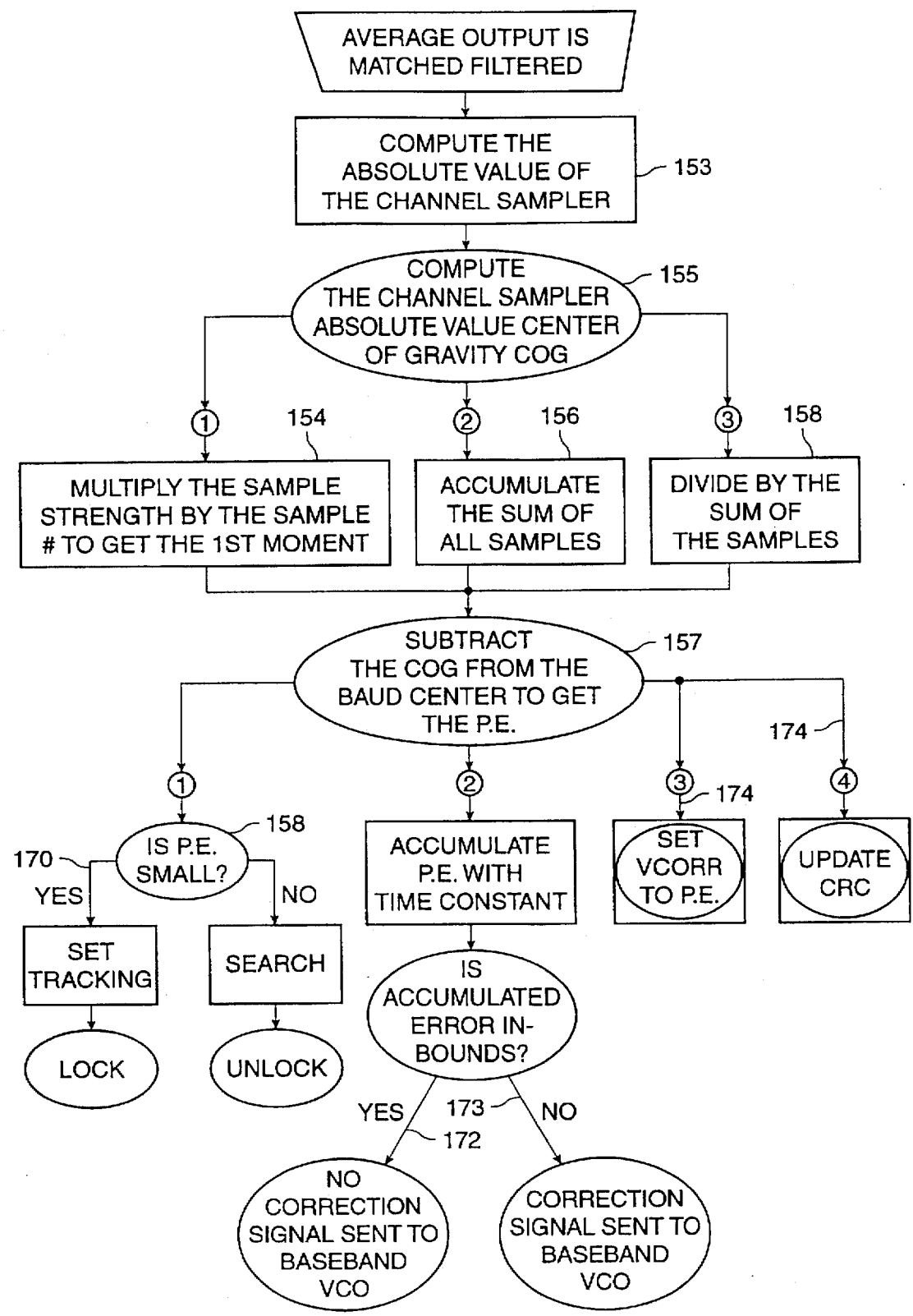
FIG. 21B is a flowchart for the baud clock controller of FIG. 21A.
Figure 21C:
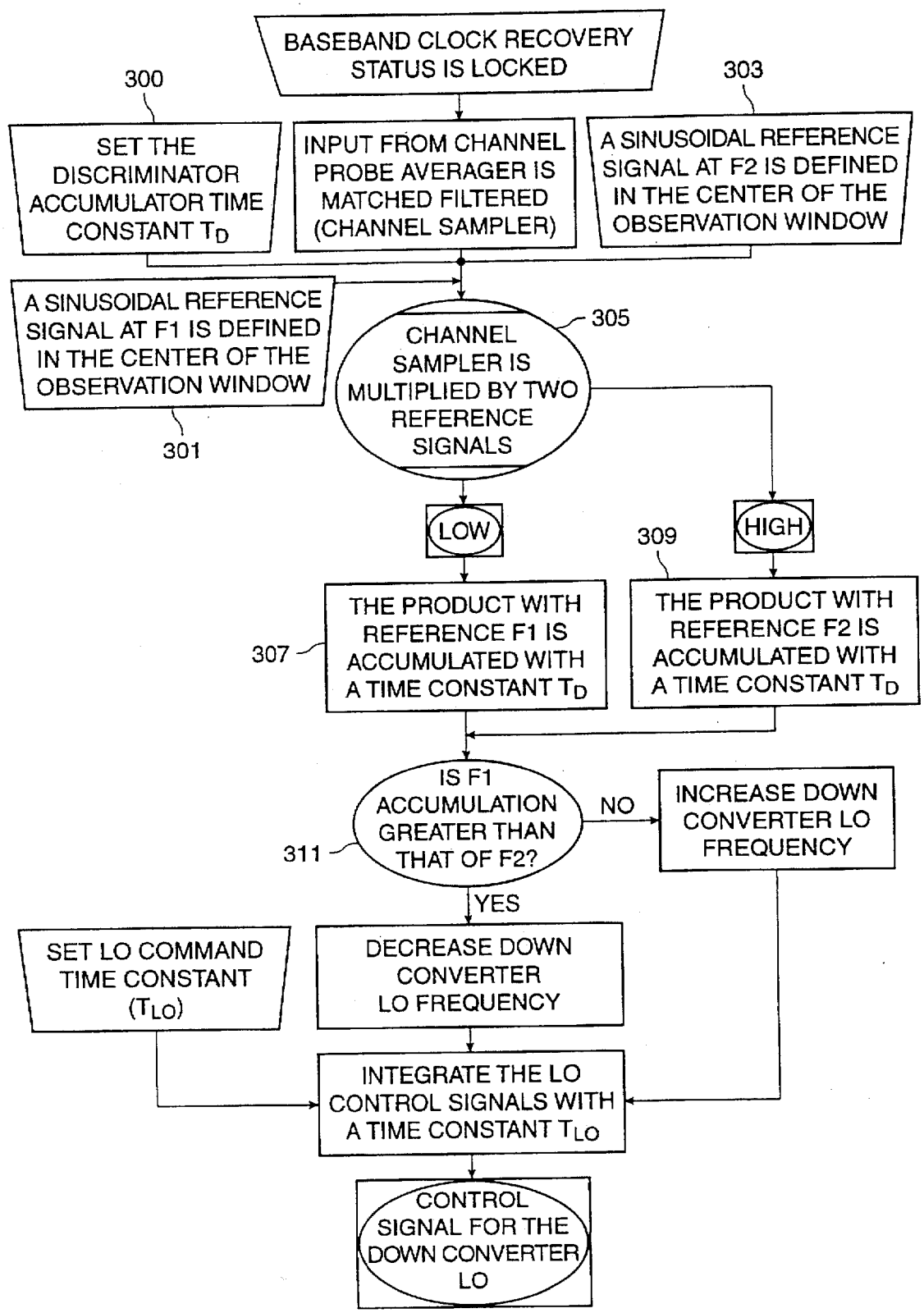
FIG. 21C is a flowchart illustrating the steps taken for carrier clock recovery in the receiver illustrated in FIGS. 20A and 20B.
Figure 21D:
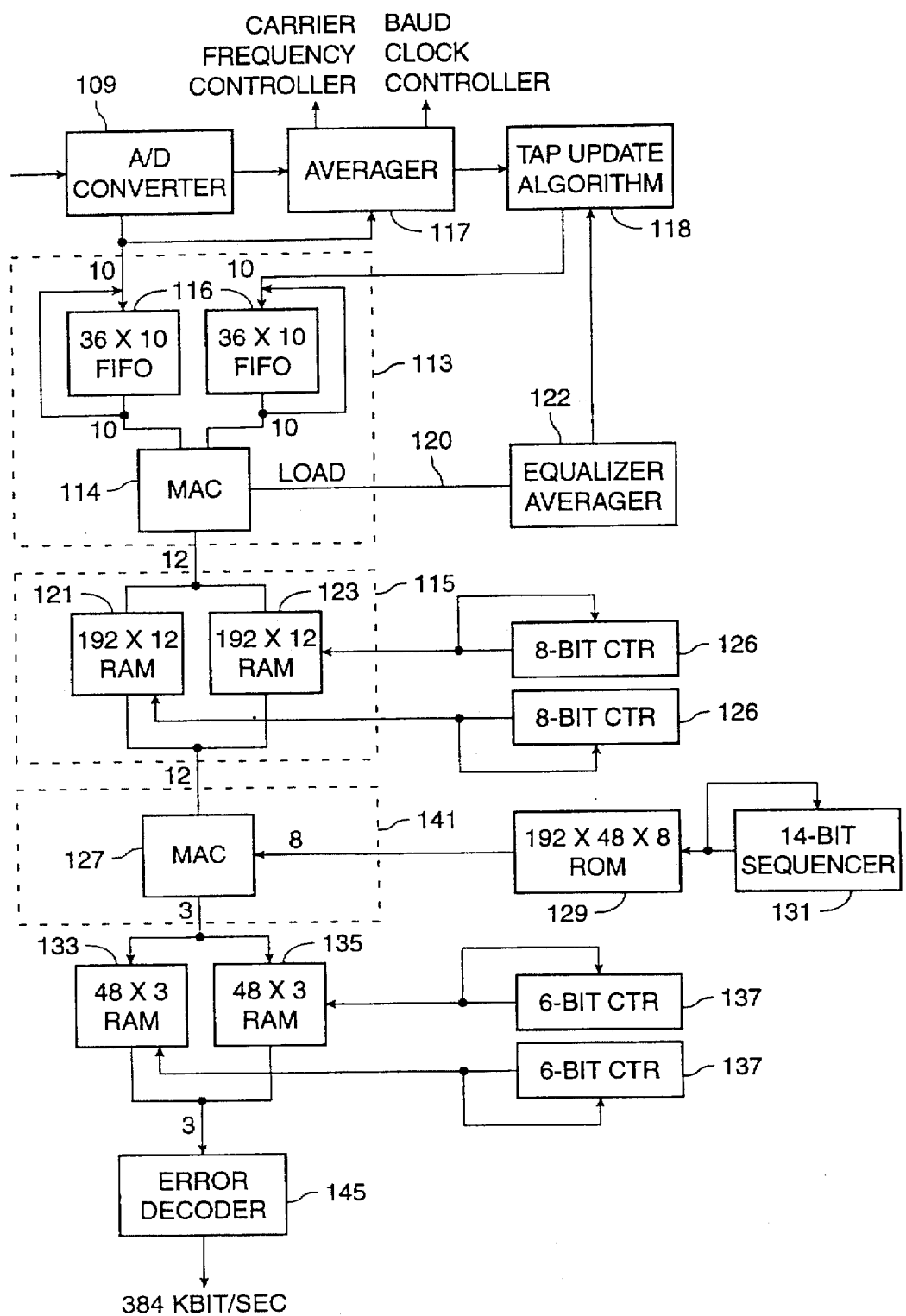
FIG. 21D is a block diagram of certain signal processing units of the receiver depicted in FIGS. 20A and 20B according to a particular hardware embodiment of this invention.

FIG. 21D is a block diagram of a hardware system which may be used to process and demodulate the digitized signal following digital conversion. The digitized samples are passed from A/D converter 109 through 36-tap equalizer 113 implemented as a direct-form finite impulse response (FIR) filter. There must be enough taps in the equalizer to span the expected multipath delay range (5–30 microseconds for VHF). Thirty-six taps at 1.536 MHz means that the equalizer in this embodiment spans 23 $\mu s$. The maximum number of taps would be the number of samples in a baud (e.g., 192) but this usually is not practical.

The FIR filter of equalizer 113 is implemented with a fast MAC hardware unit 114. The speed of MAC unit 114 is such that 36 MACs are performed in 1/1.536 MHz, namely the amount of time between digitized samples. Alternatively, the MAC function may be interleaved among multiple MAC hardware units in order to reduce the throughput requirement for each individual MAC.

The delay memory for the FIR filter in equalizer 113 and the tap weight coefficients are stored in recirculating first-in first-out RAM queues (FIFOS) 116 which have 10 bit widths. Concurrent with each analog-to-digital conversion at converter 109, MAC unit 114 within equalizer 113 is cleared and preloaded, and the oldest sample from the delay FIFO 116 is dropped. The tap weights of equalizer 113 are sequentially updated by a tap update algorithm 118 such as LMS. Other tap update algorithms such as Levinson-Durbin and Recursive Least Squares may also be used in certain embodiments.

MAC 114 of equalizer 113 (other MAC's herein are similar) is defined as a multiply/accumulate hardware unit. It requires two input bit operands, designated X and Y, and produces a single output operand. The MAC is implemented with parallel adders and therefore produces the output operand after a fixed-time interval, having been triggered by a clock pulse. The output operand is defined as the twos-complement bit-wise product of the two input operands summed with the previous value of the accumulator. The new output operand is returned to the accumulator for the next operation.

The MAC accumulator may be cleared (reset to zero) upon the exertion of an external clear line (not shown). Additionally, the accumulator of MAC 114 may be pre-loaded to one of the input operands, arbitrarily chosen as the Y operand, upon the exertion of conventional load line 120. For details of a typical MAC integrated circuit, see the IDT7210L data sheets from Integrated Device Technology, Inc., Santa Clara, Calif., this MAC hardware unit being used to implement filtering and correlation functions with the minimum width of the bit operand required varying according to how the MAC is used. The operand bit widths are shown in FIG. 21D.

Tap algorithm update unit 118 is continuously updated with both the output of averager 117 and equalizer averager 122 in accordance with the Least Means Square Algorithm (LMS) used by unit 118. Tap update algorithm 118 (FIG. 21D) and equalizer controller 118 (FIG. 20B) are equivalent.

The equalizer update algorithm makes use of the averaged reference signal in order to determine the effect of the RF channel propagation characteristics. The receiver has access (i.e., stored in a ROM) to the true, unimpaired reference signal, and hence it may apply one of the algorithms (e.g., LMS, Levinson-Durbin, etc.) in order to set the equalizer tap weights to linearly process the disturbed reference signal to more closely resemble the true reference signal. In the process, this "undoing" of the multipath disturbance also serves to compensate the modulated data waveforms since those signals are subject to the same propagation disturbances as the reference signal.

In addition to being processed through equalizer 113, the digitized baud samples are also routed from A/D converter 109 to reference signal averager 117. Averager 117 includes a 192-element memory with an 8-bit width which reflects the number of digitized samples in one baud (8 kHz baud rate at 1.536 MHz). Reference signal averager 117 takes each of the 192 samples per baud and statistically averages them across multiple bauds (typically about 50 bauds) so that random variations in the samples with respect to data waveforms are eliminated, thus leaving the bias making up the reference signal output from generator 41. Averager 117 includes a single-pole infinite-impulse response (IIR) filter which is implemented with a MAC hardware unit. The throughput of this MAC unit is modest, because it need only update once per digitized sample.

In order to facilitate operation of the equalizer tap update algorithm 118 and in order to remove the bias of the reference signal from the equalized digital samples, the equalized samples are averaged with the 192 element memory within averager 117. This function is time-interleaved with the same MAC unit.

The number of baud averages (e.g., about 50) is significant to proper performance, because if an insufficient number of bauds is averaged, the random data-dependent signal will not be mitigated, thus disturbing the reference signal. In other words, if the running average of averager 117 extends over too few bauds, the S/N ratio of the reference signal is low. On the other hand, if too many bauds are averaged, the S/N ratio of the reference signal is high and if MP changes during this averaging period, the averager response is greatly distorted—this compromises the performance of the adaptive equalizer which uses the averager to estimate the RF channel's characteristics. Thus, the average is taken over from about 40–70 bauds in certain embodiments of this invention.

The contents of the averager 117 memory are directly used to determine the tap weight updates for equalizer 113 via the EMS algorithm at subsystem 118. The contents of averager memory 117 after being matched filtered at 151 are further used to determine the baud clock or baseband frequency adjustment via controller 111, and the carrier frequency adjustment via local oscillator 103.

The Levinson-Durbin algorithm may be used at subsystem 118 to control equalizer 113, while the embodiment illustrated in FIG. 21D uses LMS. Alternatively, the Recursive Least Squares algorithm may be instead used.

The baud clock frequency adjustment (also known as the baseband clock recovery) is shown in FIGS. 20, 21A, 21B, and 21D. The baud clock frequency adjustment controls the 1.536 MHz A/D converter 109 sample rate via controller 111. When divided by 8, as with a 3-bit toggle counter, this frequency is also the fundamental 384 kHz bit clock.

The carrier clock frequency adjustment controls oscillator 103 via frequency error measurer 116. Both oscillators, 103 and 111, may be implemented with direct-digital synthesis (DDS) hardware units such as Qualcomm Q2334 DDS or alternatively with phase locked loop synthesizers. At this time that there is no implied phase coherence between the carrier clock and the baud clock—any such coherence that might exist at the transmitter is eliminated by Doppler frequency variation and the like.

Referring again to FIG. 21D, the equalized digital samples are loaded into one of two 192-element RAMs 121 and 123, each RAM having a 12-bit width, the loading alternating from one baud to the next baud. This is required so that the contents of one of RAMs 121 and 123 reflecting the entire previous baud may be processed undisturbed as the equalized samples from the current baud are being gathered. Hence, RAMs 121 and 123 operate in a "ping-pong" manner with a latency of one full baud. RAMs 121 and 123 of FIFO buffer 115 are triggered by 8-bit counters 126.

The processing required is the correlation of the equalized samples for a complete baud with each of the 48 modulated waveforms making up the 48 carriers of the baud set. This processing is accomplished with MAC hardware unit 127. The throughput of MAC 127 must be such that 192×48 MACs are completed in the interval of one baud, this interval being about 125 µs in certain embodiments. RAMs 121 and 123 are implemented within FIFO buffer 115 shown in FIG. 20B.

Correlation with the 48 different sequences or waveforms of each baud is implemented via MAC 127 and ROM 129. The 48 basis waveforms in each baud are stored end-to-end and organized in ROM 129 which has an 8-bit width, the address generator 131 for ROM 129 being 14-bit modulo 192×48 counter 131. Thus, ROM 129 is essentially a basis sequence or waveform generator disposed within the receiver.

MAC 127 multiplies the samples of each baud pairwise by each of the 48 sequences, and then adds them up. At the start of each baud, MAC unit 127 (which makes up multiplier 141 and comparator 143) is clocked 192 times to accumulate the correlation of the previous baud with the first waveform output (e.g., "Channel 1" carrier) from ROM 129. Thereafter, MAC 127 determines the binary value of the Channel 1 carrier (i.e., 0 or 1). In other words, the basis Channel 1 waveform is emitted from ROM 129 and multiplied with the composite baud digital signal output from RAMs 121 and/or 123 in order to obtain the modulated Channel 1 carrier This sample is then rounded to 3-bit precision and directed toward one of two 48-sample RAMs 133 and 135, each with a 3-bit width. At this point, ROM address counter 131 will select the first sample of the next basis waveform from ROM 129 (i.e., Channel 2), and MAC 127 is cleared to prepare for the next correlation accumulation. This process is repeated for the remaining 47 sequences within the set making up one baud, each resulting sample being sent to RAMS 133 and 135.

The 3-bit width on the digital output in RAMs 133 and 135 is only needed for soft-decision Viterbi error decoding. If only Reed-Solomon is used, for example, the path need only be one (1) bit wide.

The 48-element RAMs 133 and 135 are organized in a ping-pong manner just as the equalized baud sample RAMS 121 and 123 are. New bit samples are written to one of RAMs 133 and 135 while the alternate RAM is being read by external error decoding hardware 145, such error decoding hardware 145 being conventional Viterbi convolutional and/or Reed-Solomon block decoding hardware and algorithms. Because the binary value of each waveform or channel is determined by MAC 127, the digital data stream output of RAMs 133 and 135 is sent to error protection decoder 145 and then to a MUSICAM decoder including a descrambler, after which it is conventional digital audio data which may be reproduced as music or the like.

The roles of RAMs 133 and 135 alternate from baud to baud in order to allow the previous baud correlation output bit stream to be read at a uniform rate while the correlation sums are produced at the MAC output operand. RAMs 133 and 135 as shown are indexed by address generators implemented with 6-bit modulo forty-eight counters 137. Thus, multiplier and integrater unit 141 and comparator 143 made up by MAC 127, and RAMs 133 and 135 simply form a correlation-type detector which reproduces bit patterns as previously encoded at the transmitter.

FIGS. 21A and 21B are block diagram/flowcharts of the system utilized for controlling the baseband (or baud) of A/D converter 109 via controller 111. This system functions to establish the proper frequency of operation for the sample clock voltage controlled oscillator (VCO) in controller 111 for A/D converter 109 which must be substantially synchronous with the baud clock in the transmitter. This baud clock recovery system illustrated in FIGS. 21A and 21B also functions to establish A/D sample synchronization so that the true first sample of the baud is the first sample that is written into RAMs 121 and 123 which are used to perform the matched filter correlations with MAC 127.

Once the proper frequency is established, every 192 samples will correspond to a baud. The "baud marker" indicates which one of every 192 samples corresponds to the first sample in the baud. They may be termed control signals which act to clear 8 bit counters 126.

The baud clock in controller 111 is adjusted to have the same frequency as that in the transmitter so that the data emerging from the receiver is synchronous with the transmitter data and the reference signal does not move relative to the baud marker. When the number of samples per baud and the baud clock (or baseband frequency) is correct, the reference signal timing relative to the start of the baud signal will not change. The receiver baud marker is correctly timed relative to the incoming bauds to minimize the error rate. Further, when the reference signal does not substantially move from baud to baud, equalizer 113 can correctly position the reference signal to meet its timing requirement and compensate for multipath.

The digitized signal is sent from A/D converter 109 to averager 117. In averager 117, the data from the incoming bauds is added on a sample by sample basis with the running average of previous bauds. The data averages out thus leaving the reference signal. Averager 117 extracts the reference signal from the digital signal forwarded by converter 109 thus allowing averager 117 to provide a running average of the distorted reference signal. The signal-to-noise ratio of the reference signal (or channel probe) is then maximized by matched filter 151. After being match filtered, the reference signal is forwarded to both baud clock controller 111 and frequency controlled oscillator 103 to allow the frequencies of these voltage controlled oscillators to be controlled.

With respect to controller 111, a moving receiver or moving multipath causes the received FM/digital signal to be Doppler shifted, thus changing the timing of the baud(s). However, multipath does not materially impact the sampling clock frequency, although it does distort the timing. Controller 111 and the baud clock therewithin function to hold the frequency substantially constant to allow equalizer 113 to adjust the data signal (and reference signal) with respect to phase.

The reference signal should be in the same frequency band as the data to be an effective measure of the channel. The reference signal SNR at the receiver is increased through averager 117 because the reference signal is constant from baud to baud while noise and the data modulation is random. Hence, the reference will tend to coherently add while the random perturbations will tend to cancel each other out in the averager. Therefore, it is possible to operate the reference signal at a lower transmitter power level.

The reference signal is designed so that its position in each baud can be measured. The processed output after averager 117 and filter 151 has a sharp peak often in the approximate center of each baud. Because averager 117 coherently adds the reference signal and incoherently adds the data, the S/N ratio of the reference signal is increased and the filtered version has a desired shape with a localized amplitude.

Controller 111 tracks the frequency of the filtered reference signal as opposed to its phase. It is thus blind to multipath distortion and immune to MP-induced search caused by phase tracking. The frequency sensitive tracking of controller ill keeps the position of the reference signal constant and allows equalizer 113 to reposition the reference signal. MP distorts the reference signal thus causing the position of the largest amplitude from filter 151 to move accordingly. Controller 111 measures the reference signal center of gravity (COG) as a means for measuring and computing the precession of the reference signal relative to the baud start sample.

The absolute value of the matched filtered reference signal is taken in step 153 (see FIG. 21B) to establish an approximate reference signal envelope and multiplied by the time interval from the point where the baud was assumed to begin in step 154. In other words, multiplying the sample amplitude by the same number in step 154 relative to the first sample in the baud produces a first moment. The products for all samples are added together in step 156 and divided by the sum of the samples in step 158 to compute the reference signal absolute value "center of gravity" (see step 155). Because the first moment for the matched filtered averager output has the same characteristics as a center of gravity (COG) calculation, the COG technique is used for locating the effective center of the distorted reference signal in step 155. Thus, the COG is a good way in which to compute the precession of the reference signal relative to the baud start sample.

If the baud frequency is correct, variations in distortion will cause the COG location to oscillate, but will not cause it to precess. Doppler shift of the incoming signal and baud clock frequency differences between the transmitter and receiver do, however, cause precession. The effective error in the baud rate frequency is determined by measuring the rate of precession of the COG location in step 157 by subtracting the COG from the baud center. The COG for a correctly timed and MP-free reference signal is computed when the receiver is calibrated.

The rate of change of difference between the channel sampler or reference signal COG and the ideal COG is called the position error (PE). The rate of change of PE is a measure of the sample clock or baud clock frequency error. Thus, by determining the position error (PE) of the COG in step 157, baud clock frequency offsets and Doppler shifts are simultaneously eliminated by adjusting the baud clock frequency in step 159 via controller 111 to drive the precession rate to substantially zero. By determining via frequency measurement the error amount in the baud rate in step 158, steps 170–174 adjust the voltage controlled oscillator in controller 111. If the average indicates that the frequency is too high, a lower VCO control voltage is issued to the sample clock in step 159, and if the average indicates that the frequency is too low, an increase in the VCO control voltage is issued.

If the PE is small, the oscillator is not adjusted (step 170) in certain embodiments. However, if there is substantial PE of the COG, step 171 is carried out to determine the extent of the error. If it is in bounds of (or within plus or minus about 4 samples) so that equalizer 173 can handle it, no correction signal is sent to the baseband oscillator (step 172). However, if the PE is out of bounds (i.e., more than±four (4) samples difference between the true baud center and the center as set through the PE algorithm), a correction signal is sent to the oscillator in step 173, and correction is carried out in steps 174 via adjusting the baud clock voltage controlled oscillator. It is noted that the COG is also utilized to calculate where each baud began using baud start estimator 161 thus producing the baud marker. The baud marker is a pulse which is output every 192 samples. A 14-bit sequencer 131 and counters 126 (see FIG. 21D) both receive the baud marker pulse in order to ensure synchronization.

The output of averager 117 and matched filter 151 is also utilized to ensure correct operation of oscillator 103 thereby providing proper carrier clock frequency. FIG. 21C is a self-explanatory flowchart of the system for controlling oscillator 103 via the matched filter reference signal output from filter 151. The baseband and carrier frequencies must be controlled by different oscillators because Doppler affects the baud clock and carrier clock to different extents. LO 103 is adjusted as follows so the IF center frequency in the receiver is the same as in the transmitter.

The carrier clock recovery system tracks multipath induces IF center frequency phase changes. The reference signal need be in the same frequency band as the data to be an effective measure of MP distorting.

The reference signal is designed with a center frequency near (within about 1%) the data signal center frequency so that setting the reference signal center frequency is substantially equivalent to setting the frequency of the data. The IF center frequency is chosen in certain embodiments as an even harmonic of the baud rate so that the phase of the IF carrier with correct frequency rotates an integer ×360° in one baud period thereby allowing the receiver to interpret phase rotation of reference signal as an IF frequency error. A frequency sensitive tracking loop keeps the phase of the reference signal constant thereby allowing equalizer 113 to reset the phase of the reference signal and along therewith the phase of the digital data signal. As shown, time constant T d is defined in step 300 as about 100 times the baud period and truncated and frequency shifted replicas F1 and F2 of the channel sampler are generated in steps 301 and 303, the channel sampler being the triangularly shaped weighted cosine wave output from matched filter 151.

F1 is a frequency about 0.01% below the ideal IF truncated to about 10% of the baud while F2 is a frequency about 0.01% above the ideal IF truncated to about 10% of the baud. F1 and F2 are truncated in such a manner because the reference signal is only large near the center of the baud.

F1 is multiplied by the channel sampler on a sample by sample basis with the products summed in step 305. The sum of products is subtracted from the value computed on the previous baud. The difference represents baud to baud change and frequency F1 error. This F1 error is accumulated in step 307 over several hundred bauds to get a running average F1 error. The F2 running average error is determined in steps 305 and 309 in the same manner.

In step 311, if the F1 accumulation is equal to the F2 accumulation, LO 103 is not adjusted. However, if F1 accumulation is greater than that of F2, the oscillator frequency is increased. The opposite is true if F2 is less than F1.

The above described embodiment in which a composite signal, including an analog FM portion and a digital portion is transmitted, is exemplary of this invention. It is not intended that the scope of the invention be limited to the exemplary embodiments. For example, the digital data could be transmitted alone, without linear summing with the analog FM signal in various environments, thereby providing simple digital data transmission from one point to another whether by wire or through atmospheric free space. Such digital data transmission is useful in systems such as digital data storage and retrieval systems, wired and wireless LANS, microwave digital communication systems, cellular telephone systems, etc. An exemplary embodiment would be the transmission of a two-lobed digital signal as described herein in an environment having known colored interference at a particular frequency. The basis set may be spectrally shaped in such a case so that the two lobes surround the frequency at which the interference (e.g., conventional microwave interference) is present. Additionally, the basis set of orthogonal waveforms output from generator 37 need not be spectrally shaped into two separate and spaced apart lobe or passband portion; instead, the waveforms may be shaped into a single lobe portion containing substantially all of the digital data to be transmitted. Such spectral shaping would be advantageous in environments not having interference such as the above mentioned analog FM signal of the first embodiment or any other type of colored interference.

Additionally, dynamic interference cancelling may be utilized in certain embodiments so as to filter out specific portions of the received signal in environments having strong colored interference. Such interference cancelling filters may be implemented following equalizer 113 or alternatively as part of equalizer 113. The taps of equalizer 113 may be programmed in such a manner that the equalizer itself filters out the colored interference. Once given the above disclosure, many other features, modifications and improvements will become apparent to the skilled artisan. Such other features, modifications, and improvements are, therefore, considered to be a part of this invention, the scope of which is to be determined by the following claims.

What is claimed is:

1. A signal receiver for receiving through a medium a radio frequency signal including a digital signal, said digital signal being robust to multipath degradation and intersymbol interference, said receiver comprising:

means for receiving said radio frequency signal wherein said digital signal is composed of a modulated set of spectrally shaped and substantially orthogonal modulated waveforms defined by multivalued numerical sequences of substantially equal length having good autocorrelation properties; and demodulation means for determining and outputting digital data from said digital signal represented as said spectrally shaped and substantially orthogonal waveforms.

2. The signal receiver of claim 1, further comprising frequency tracking means for following frequency variations of a wideband reference signal transmitted along with said digital signal, said frequency tracking means comprising:

means for establishing a center of gravity of said reference signal;

means for measuring the rate of precession of the center of gravity, and, based on the measured rate of precession of the reference signal center of gravity, means for issuing adjustment instructions to an oscillator for adjusting frequency of a baud clock determined by said oscillator.

3. The receiver of claim 1, said radio frequency signal comprising a composite FM/wideband digital signal, said composite signal being a linear combination of an FM signal and a wideband digital signal, said wideband digital signal being constrained to occupy a first spectrum portion and a second spectrum portion about a center frequency of said FM signal, said receiver further comprising:

tracking means for following a reference signal transmitted along with said composite FM/wideband digital signal;

means for adjusting a baud clock in said receiver based on frequency of said wideband reference signal; and means for separating said composite FM/wideband digital signal into a conventional FM channel and a wideband digital signal channel.

* * * * *